US011082820B2

(12) United States Patent
Stammers et al.

(10) Patent No.: US 11,082,820 B2
(45) Date of Patent: Aug. 3, 2021

(54) SERVICE INTERFACE TEMPLATES FOR ENTERPRISE MOBILE SERVICES

(71) Applicant: Cisco Technology, Inc., San Jose, CA (US)

(72) Inventors: Timothy Peter Stammers, Raleigh, NC (US); Mehdi RaisGhasem, Monument, CO (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 92 days.

(21) Appl. No.: 16/194,369

(22) Filed: Nov. 18, 2018

(65) Prior Publication Data

US 2020/0162870 A1    May 21, 2020

(51) Int. Cl.
| | |
|---|---|
| *G06F 15/16* | (2006.01) |
| *H04W 4/50* | (2018.01) |
| *H04W 4/021* | (2018.01) |
| *G06F 9/54* | (2006.01) |
| *G06Q 10/06* | (2012.01) |
| *H04L 29/08* | (2006.01) |

(52) U.S. Cl.
CPC ............ *H04W 4/50* (2018.02); *G06F 9/54* (2013.01); *G06Q 10/06* (2013.01); *H04L 67/36* (2013.01); *H04W 4/021* (2013.01)

(58) Field of Classification Search
CPC ................................ H04W 4/50; H04L 67/36
See application file for complete search history.

(56) References Cited

U.S. PATENT DOCUMENTS

| | | | | |
|---|---|---|---|---|
| 8,798,579 | B2* | 8/2014 | Hickie | G06F 21/604 |
| | | | | 455/410 |
| 9,152,781 | B2* | 10/2015 | Sowatskey | G06F 21/31 |
| 9,998,446 | B2 | 6/2018 | Branden et al. | |
| 10,116,642 | B2* | 10/2018 | Trevathan | G06F 16/86 |
| 2002/0133422 | A1 | 9/2002 | Kenney et al. | |
| 2006/0023722 | A1* | 2/2006 | Jung | H04M 1/72451 |
| | | | | 370/395.4 |

(Continued)

OTHER PUBLICATIONS

"Architecture Enhancements for Service Capability Exposure", Jun. 2015, 3rd Generation Partnership Project, 3GPP TR 23.708.*

(Continued)

*Primary Examiner* — Douglas B Blair

(57) ABSTRACT

A service interface template for an enterprise mobile service of a mobile network may be provided for use by an enterprise. The service interface template may involve an API at an API endpoint for enterprise exposure and control over at least a subset of mobile service functions of the mobile network for use in relation to a plurality of UEs of the enterprise. The API may be defined by API request types to perform operations in relation to resources of a data store. The resources may include a collection of selectable parameter indication elements corresponding to selectable parameter indications for use in provisioning mobile service functions. A backend interface function may be provided for the API endpoint, to cause the provisionable mobile service function to be provisioned and/or executed with provisionable parameters corresponding to a selected one of the selectable parameter indications received via the API endpoint.

18 Claims, 24 Drawing Sheets

(56) References Cited

U.S. PATENT DOCUMENTS

| | | | | |
|---|---|---|---|---|
| 2013/0097651 | A1* | 4/2013 | Rendahl | G06F 9/45558 726/1 |
| 2013/0176975 | A1* | 7/2013 | Turanyi | H04W 72/087 370/329 |
| 2013/0267229 | A1* | 10/2013 | Gopalakrishnan | H04W 36/00835 455/436 |
| 2013/0303114 | A1* | 11/2013 | Ahmad | H04M 15/49 455/406 |
| 2013/0316703 | A1* | 11/2013 | Girard | G06Q 30/0257 455/432.1 |
| 2015/0120917 | A1* | 4/2015 | Gabrielson | H04L 47/70 709/224 |
| 2015/0163675 | A1* | 6/2015 | Chang | H04L 63/0876 455/411 |
| 2015/0248565 | A1* | 9/2015 | Onodera | H04M 3/42348 726/1 |
| 2015/0341401 | A1* | 11/2015 | Lee | G06F 3/0481 715/753 |
| 2016/0150076 | A1* | 5/2016 | Foladare | H04W 4/029 370/259 |
| 2016/0261424 | A1* | 9/2016 | Gamberini | H04L 67/125 |
| 2018/0027006 | A1* | 1/2018 | Zimmermann | H04L 63/0227 726/11 |
| 2018/0176326 | A1* | 6/2018 | Shantharam | G06F 9/4451 |
| 2018/0184331 | A1* | 6/2018 | Samdanis | H04W 28/16 |
| 2018/0217871 | A1* | 8/2018 | Doshi | G06F 9/5072 |
| 2018/0270363 | A1* | 9/2018 | Guday | H04M 15/8214 |
| 2019/0259092 | A1* | 8/2019 | Oktay | G06Q 30/08 |
| 2020/0015158 | A1* | 1/2020 | So | H04W 48/18 |

OTHER PUBLICATIONS

Android Developers, "Network Capabilities", https://developer.android.com/reference/android/net/NetworkCapabilities?hl=en, downloaded Mar. 19, 2019, 22 pages.

Erik Guttman, "3GPP Initiates Common API Framework Study," May 9, 2017, pp. 1-2.

Sconnect, "Service Provider Network Control: Dynamic Provisioning of Flat Networks," 2018, pp. 1-17, available at https://www.6connect.com/wp-content/uploads/Automating-Wireless-Service-Provider.pdf.

Qadir et al., "Network as a Service: The New Vista of Opportunities," Jun. 2016, pp. 1-7.

"Study on Common API Framework for 3GPP Northbound APIs," 3rd Generation Partnership Project (3GPP), Technical Report, 3GPP TR 23.722 V15.1_0, Apr. 2018, pp. 1-65.

"Representational State Transfer (REST) reference point between Application Function (AF) and Protocol Converter (PC)," 3rd Generation Partnership Project (3GPP), Technical Specification, 3GPP TS 129.201 V12.0.0, 2014, pp 1-32.

"Policy and charging control over Rx reference poinrt," 3rd Generation Partnership Project (3GPP), Technical Specification, 3GPP TS 129.214 V14.3.0, Apr. 2017, pp. 1-58.

* cited by examiner

1100 →

1102 →

Select Location Area 1:
- ☐ West Coast ← 1104
- → ☑ South West ← 1106
- ☐ Midwest
- ☐ East Coast
- ☐ All Other
- ☐ All Locations

1112 →

Select Location Area 2:
- ☐ North Side (Chicago) ← 1114
- → ☑ South Side (Chicago) ← 1116
- ☐ All Other

1122 →

Select Bandwidth / Throughput:
- ☐ Normal / Medium ← 1124
- → ☑ High
- ☐ No Limit ← 1126

1132 →

Select Time Period for Periodic Upload or Reporting:
- ☐ 30 Minutes
- → ☑ 1 Hour ← 1134
- ☐ 8 Hours ← 1136
- ☐ 1 Day

Enterprise Name : Cisco Technology, Inc.

Enterprise Mobile Service — 1902

Mobile Service Function ID: *Emergency_Notify*
   Mobile Service Function ID: *Periodic_App_Reporting*
   Mobile Service Function ID: *Periodic_Data_Upload*
1920  Mobile Service Function ID: *Server-Access-Triggered Reporting*

1904

MEMBER 1

| | |
|---|---|
| Member Name: | John Doe |
| Member ID: | 006 — 1906 |
| Mobile ID: | 999-123-4567 |
| Department: | Accounting-SJ |
| Location Area: | Cali |
| Member Type: | Manager |
| Member Rank/Status: | 15 Years |
| Group ID: | Accounting |

1908

MEMBER 2

| | |
|---|---|
| Member Name: | Jane Smith |
| Member ID: | 007 — 1910 |
| Mobile ID: | 999-123-6789 |
| Department: | Engr-SJ |
| Location Area: | Cali-North |
| Member Type: | Engineer |
| Member Rank/Status: | 5 Years |
| Group ID: | Engineering |

Enterprise Mobile Service — 2002

Mobile Service Function ID: *Periodic_Data_Upload* — 2010

Assignment: Member Name: John Doe — 2014
　　　　　　　　　　Location Area: West Coast — 2016
　　　　　　　　　　Member Type: Engineer — 2018

Mobile Service Function ID: *Periodic_Data_Reporting* — 2020

Assignment: Location Area: Non U.S. — 2024
　　　　　　　　　　Time Period: 1 Hour — 2026
　　　　　　　　　　Group ID: Engineering — 2027

Mobile Service Function ID: *Server-Access-Triggered Reporting* — 2030

Assignment: Department: All — 2034
　　　　　　　　　　Server Name: Secret Files Server — 2036

FIG. 20

Assurance Data - Mobile Network Function ID: *Periodic_App_Reporting*

Log Event→08-Nov-2018-timestamp07:00-JohnDoe-France-App2,App4,App5-SentToServerUSA
Log Event→08-Nov-2018-timestamp08:00-JohnDoe-France-App4,App5-SentToServerUSA
Log Event→08-Nov-2018-timestamp09:00-JohnDoe-France-App4,App5-SentToServerUSA

Assurance Data - Mobile Network Function ID: *Periodic_Data_Upload*

Log Event→05-Nov-2018-timestamp22:00-TempSensors-DataUploadConfirmedByServer
Log Event→06-Nov-2018-timestamp22:00-TempSensors-DataUploadConfirmedByServer
Log Event→07-Nov-2018-timestamp22:00-TempSensors-DataUpload ERROR

FIG. 23

SERVICE INTERFACE TEMPLATES FOR ENTERPRISE MOBILE SERVICES

TECHNICAL FIELD

The present disclosure relates generally to a mobile network configured to provide service interface templates for enterprise mobile services with use of one or more application programming interfaces (APIs).

BACKGROUND

There is a need for a mobile network to offer a service for an enterprise, where the enterprise may view the mobile network as a logical policy extension according to rules and business goals of the enterprise.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 5);

FIG. 11 is an illustrative representation of specific examples of a plurality of selectable parameter indications (e.g. as viewed from a GUI of the enterprise) according to some implementations of the present disclosure;

FIG. 12);

FIG. 14);

FIG. 19 is an illustrative representation of example mobile service functions and enterprise member information associated with an enterprise (e.g. as viewed from a GUI of the enterprise) according to some implementations of the present disclosure;

FIG. 20 is an illustrative representation of example mobile service functions and selectively-assigned indications associated with the functions (e.g. as viewed from a GUI of the enterprise) according to some implementations of the present disclosure;

FIG. 23 is an illustrative representation of example assurance data (e.g. as viewed from a GUI of the enterprise) according to some implementations of the disclosure.

Figure 1:
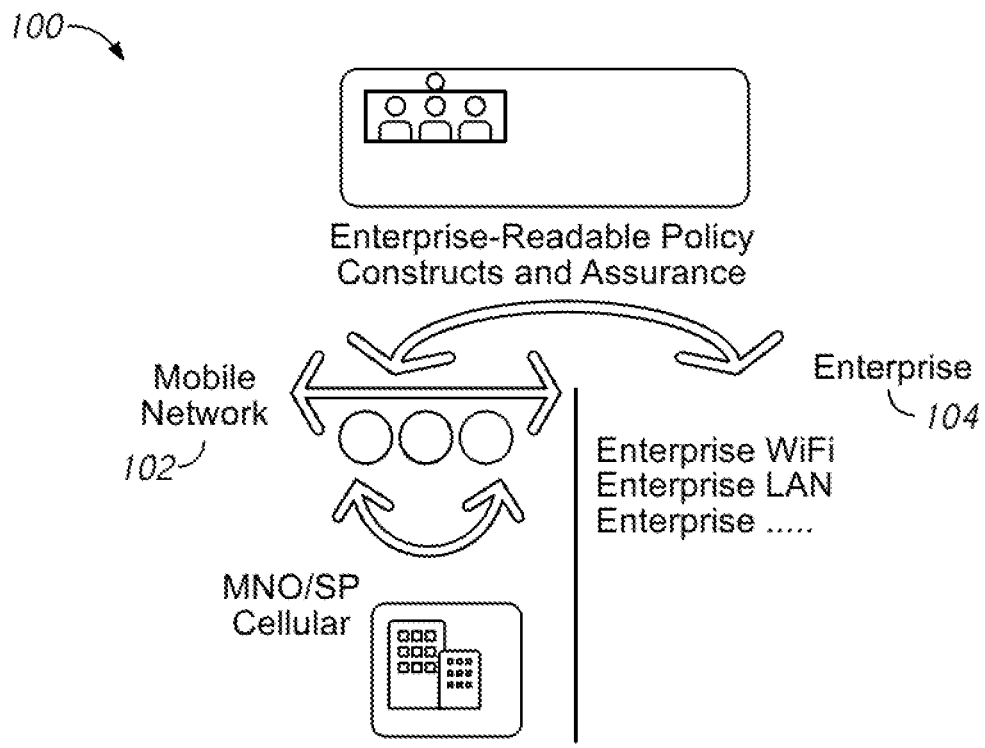
FIG. 1 is a conceptual illustration of a system which includes a mobile network and an enterprise or enterprise network.

In accordance with common practice the various features illustrated in the drawings may not be drawn to scale.

Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

In one illustrative example, a service interface template for an enterprise mobile service may be provided by a mobile network for use by an enterprise. The service interface template may involve an API at an API endpoint for enterprise exposure and control over at least a subset of mobile service functions of the mobile network for use in relation to a plurality of UEs of the enterprise.

The set or subset of the mobile service functions may represent a business construct of the enterprise. The enterprise mobile service may be a contracted enterprise mobile service which is contracted based on the service interface template.

The API may be defined at least in part by one or more API request types to perform one or more operations in relation to a plurality of resources of a data store. In some implementations, the resources operated on may include a collection of selectable parameter indication elements corresponding to selectable parameter indications for use in provisioning one of the mobile service functions. A backend interface function may be also provided at or with the API endpoint, for causing the provisionable mobile service function to be provisioned and/or executed with one or more provisionable parameters corresponding to a selected one of the selectable parameter indications received via the API endpoint.

More detailed and alternative techniques and implementations are provided herein as described below.

Example Embodiments

Mobile networks or internal business and architecture evaluations may provide mechanisms by which network capabilities are exposed for third-party use. These third parties may be internal users of the service provider (SP) network (such as SP-hosted video services) or external over-the-top (OTT) providers (such as Netflix, Hulu, etc.). An enterprise (e.g. a company or organization) may wish to use the SP network to connect their employees to the enterprise, or connect customers of that enterprise to the SP network (e.g. for a special company-hosted service). Today's technological approaches may "package-up" SP-centric constructs (e.g. REST/JSON interfaces) in a way that is more amenable to some third parties than SP-specific methods (e.g. Diameter AVPs and associated protocol).

Currently, policy and organization constructs of SP networks and third parties remain unaligned. It may be desirable to have a mobile network offer a service where an enterprise may view the SP network as a logical access network extension, with policy control and assurance, in accordance with rules and business goals of the enterprise.

According to some implementations of the present disclosure, a set of policy objects and associated application programming interfaces (APIs) may be defined and hosted by a mobile network operator (MNO)/SP, where the objects represent the business constructs of a given enterprise. The policies associated with business rules of the enterprise may be applied to those objects in terms the enterprise understands (e.g. access policies by business function membership, conditioned by location, routing and segmentation policies by business site, overlayed on the macro-cellular network).

The objects and attendant policy association may be populated by an enterprise based on templates created and validated by the MNO/SP. These templates may represent the contractual agreement between the MNO/SP and enterprises. In at least some implementations, the templates may be common across enterprises, but the population, assignment to templated policies and assurance data for policy conformance may be enterprise-specific.

Thus, at least some preferred implementations of the present disclosure involve MNO/SP-hosted templated and validated policies/assurance together with enterprise population and reception of the same for serving the intent of the enterprise.

FIG. 1 is a conceptual illustration of a system 100 which includes a mobile network 102 and an enterprise 104 (e.g. an enterprise network). Enterprise 104 wishes that mobile network 102 were an extension of its own network (e.g. in a form that the enterprise may understand and consume). Accordingly, mobile network 102 may decide to offer a Network as a Service (NaaS) to enterprises such as enterprise 104.

A NaaS may be considered to be the providing of network services from a third party to customers that do not have an interest in building or otherwise obtaining their own network infrastructure. A NaaS may package a plurality of networking resources, services, and applications as a product that can be purchased or otherwise obtained for a number of users (e.g. for a contracted period of time).

Offering such a NaaS, mobile network 102 may wish to demarcate and/or protect their network from (undue) influence by enterprises such as enterprise 104. Further, mobile network 102 may wish to expose only those services that the enterprise 104 has contracted for.

Figure 2:
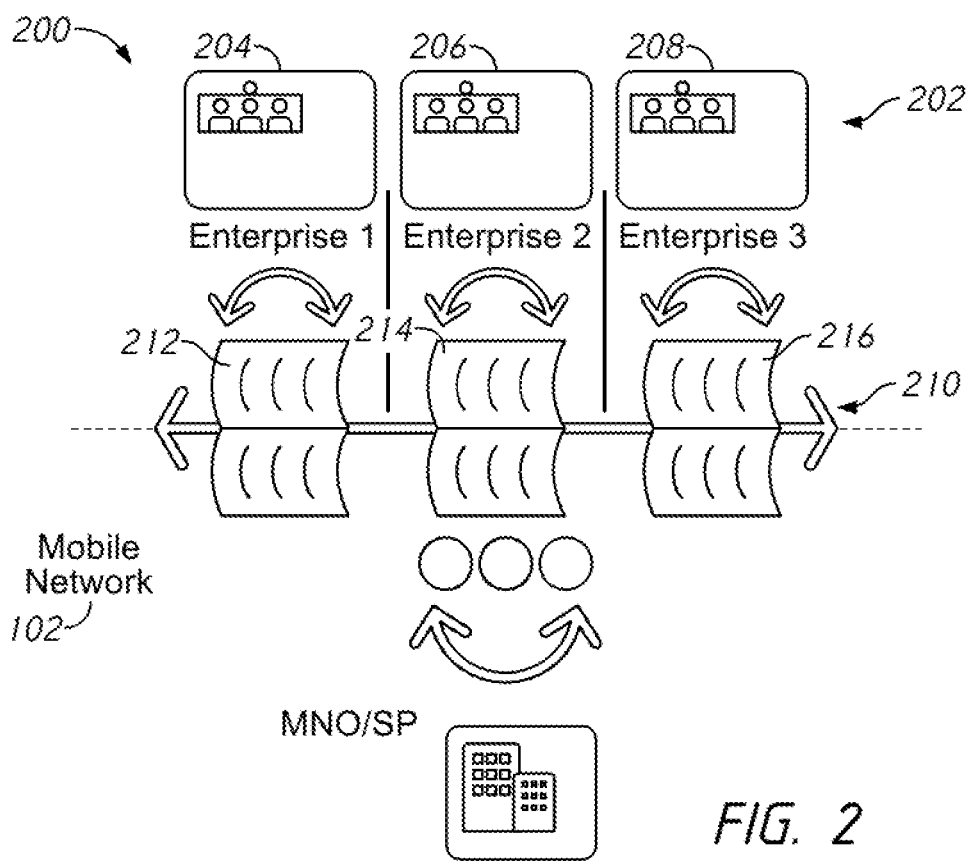
FIG. 2 is a conceptual illustration of a system which includes a mobile network which may offer enterprise mobile services for a plurality of enterprises using one or more service interface templates.

FIG. 2 is a conceptual illustration of a system 200 including mobile network 102 configured to provide enterprise mobile services for a plurality of enterprises 202. In FIG. 2, the plurality of enterprises 202 may include enterprises 204, 206, and 208. Each enterprise mobile service may be represented by one or more service interface templates or "templates" 210. In FIG. 2, the templates 210 include a template 212 which is provided for enterprise 204, a template 214 which is provided for enterprise 206, and a template 216 which is provided for enterprise 208. Each template 212, 214, and 216 may contain (all of the) capabilities of a validated SP service. The capabilities of the validated SP service may be contracted capabilities that form the basis of a service contract. Each template 212, 214, and 216 may present a tailored view of mobile network 102 to each enterprise 204, 206, and 208, respectively, and provide an "enterprise-readable" policy construct and assurance.

Figure 3:
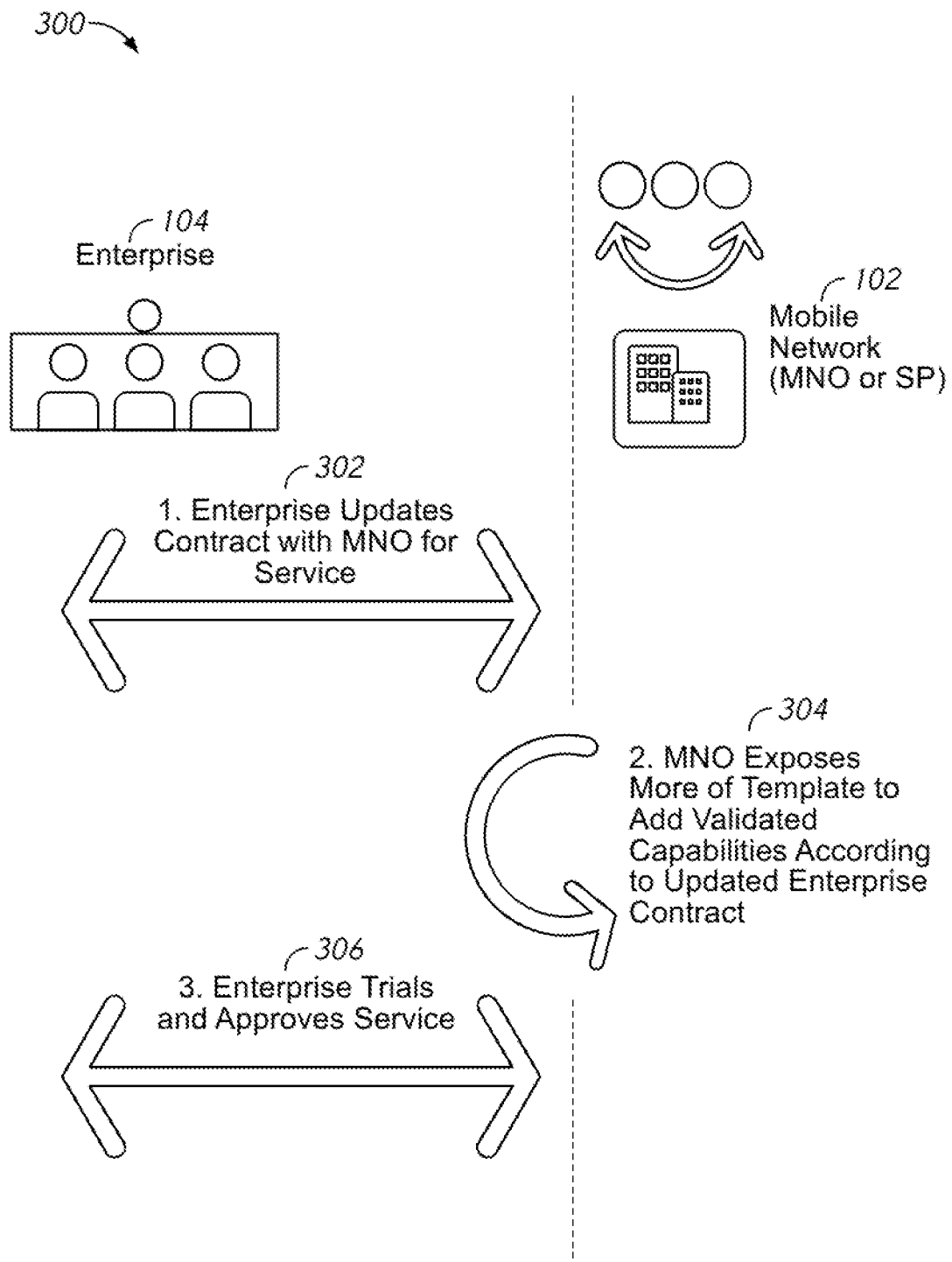
FIG. 3 is a process flow diagram for a mobile network to expose additional capabilities for an enterprise by opening additional aspects of a service interface template.

In some implementations, additional capabilities may be exposed to an enterprise over time by opening additional aspects of a currently-provided template. This is illustrated in a process flow diagram 300 of FIG. 3. In FIG. 3, enterprise 104 may update its contract with mobile network 102 to include one or more additional capabilities (step 302 of FIG. 3). Mobile network 102 may then expose more of the template to add validated capabilities according to the updated enterprise contract (step 304 of FIG. 3). Enterprise 104 may perform one or more trials of the updated capabilities and thereafter may approve the updated service for continuation of the same in accordance with the updated enterprise contract (step 306 of FIG. 3).

Figure 4A:
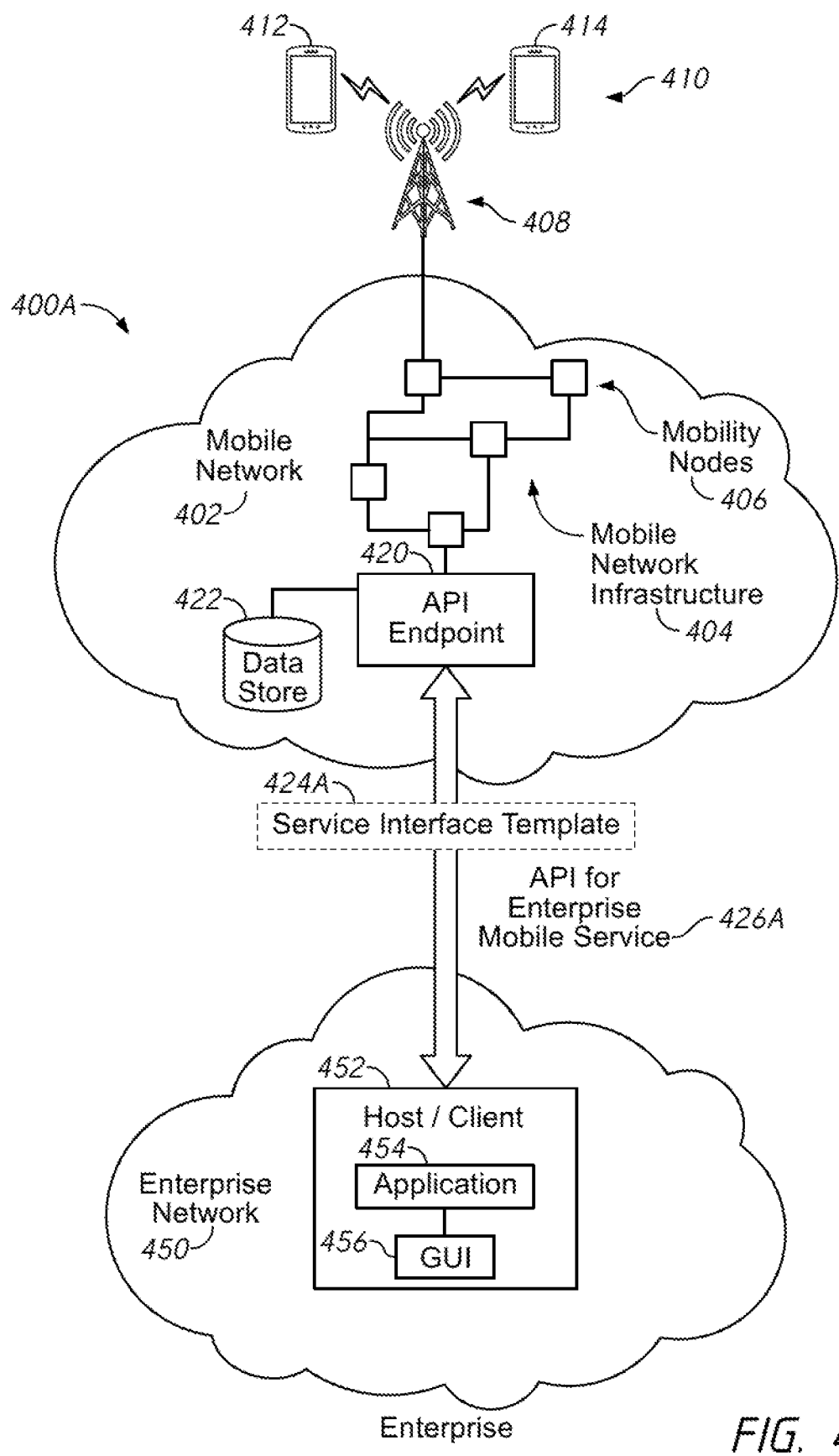
FIG. 4A is an illustrative representation of a system for providing an enterprise mobile service of a mobile network to an enterprise according to some implementations of the present disclosure.

FIG. 4A is an illustrative representation of a system 400A for providing an enterprise mobile service of a mobile network 402 to an enterprise. Mobile network 402 has a mobile network infrastructure 404 including a plurality of mobility nodes 406 and one or more base stations 408 which may serve a plurality of UEs 410, such as UEs 412 and 414. Implemented within mobile network 402 are a set of mobile service functions, at least some of which are provisionable functions.

Mobile network 402 may provide a service interface template 424A for the enterprise mobile service for use by the enterprise. The enterprise mobile service may be a contracted enterprise mobile service, which is contracted based on the service interface template 424A. The service interface template 424A may involve an API 426A; here, an API endpoint 420 in the mobile network 402 may be provided for enterprise exposure and control over (e.g. for provisioning) at least a subset of the mobile service functions. These mobile service functions may be for use in relation to UEs 410 associated with the enterprise.

For communications with API endpoint 420, the enterprise may have a host or client 452 which is connected in a (private) enterprise network 450. Host 452 may include an application 454 and associated graphical user interface (GUI) 456 for interfacing with and controlling the enterprise mobile service.

The API 426A may be defined at least in part by one or more API request types to perform one or more operations in relation to a plurality of resources of a data store 422. For example, the API may be defined at least in part by one or more API request types to perform one or more operations for creating, reading, updating, and deleting at least some of the plurality of resources in the data store 422. In some implementations, a change in a resource in the data store 422 (e.g. via GUI 456) may be used to trigger a provisioning or re-provisioning of an associated mobile network function.

In some implementations, the plurality of resources may include a collection of selectable parameter indication elements corresponding to selectable parameter indications (e.g. provided via GUI 456), for use in provisioning a mobile service function.

For example, selectable parameter indications may include selectable geographic area indications associated with selectable geographic areas, selectable bandwidth indications associated with selectable bandwidths, selectable latency indications associated with selectable latencies, selectable communication quality indications associated with selectable communication qualities, and/or others.

In some implementations, the resources may additionally or alternatively include a collection of (assignable) member identity elements corresponding to member identities of a plurality of members that are managed by the enterprise and associated with the plurality of UEs. The member identities may be, for example, member names of members (e.g. employees), member numbers, or the like. Additionally or alternatively, the resources may include a collection of (assignable) mobile identity elements corresponding to mobile identities of the plurality of UEs associated with the member identities or members. The mobile identities may be, for example, mobile telephone numbers or Mobile Station International Subscriber Directory Numbers (MSISDNs), IP addresses, or the like.

Further additionally or alternatively, the resources may include a collection of one or more (assignable) group identity elements corresponding to one or more group identities of one or more groups of member or mobile identity elements.

Further additionally or alternatively, the resources may include a collection of other assignment elements such as a plurality of member type elements corresponding to member types; a plurality of member rank/status elements corresponding to member ranks/status; a plurality of member department assignment elements corresponding to member department assignments; and/or a plurality of member location area elements corresponding to member location areas.

Again, the API may be defined at least in part by one or more API request types to perform one or more operations for creating, reading, updating, and deleting at least some of the plurality of resources in the data store 422, and a change in a resource in the data store 422 may be used to trigger a provisioning or re-provisioning of an associated mobile network function.

In some implementations, the API 426A may be further defined at least in part by one or more additional API request types to perform one or more additional operations, which may include one or more provisioning request types (e.g. for provisioning a mobile service function according to a selected parameter indication), one or more assignment request types (e.g. for assignment or association of an identity, type, etc., to a mobile service function), and/or one or more assurance request types (e.g. for requesting an enablement/receipt of assurance data for a mobile service function). Other additional operations provided via the API 426A may include one or more onboarding request types (e.g. for onboarding enterprise member identities, member names, associated mobile identities, etc.) and one or more authentication and/or authorization request types (e.g. for authentication and/or authorization of the enterprise for access).

Figure 4B:
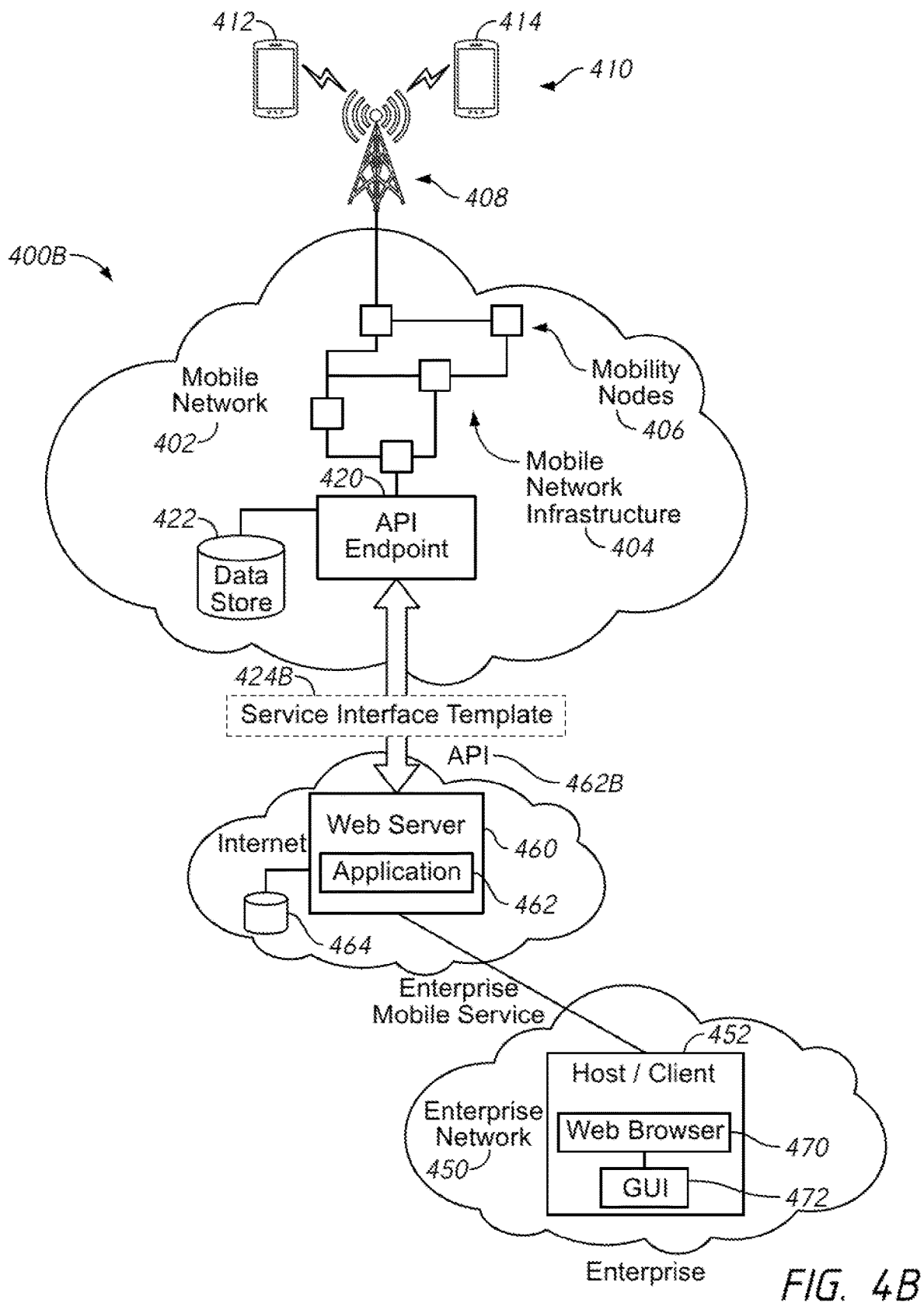
FIG. 4B is an illustrative representation of an alternative arrangement of a system for providing an enterprise mobile service of a mobile network to an enterprise according to some implementations of the present disclosure.

Showing an alternative arrangement, FIG. 4B is an illustrative representation of a system 400B for providing an enterprise mobile service of mobile network 402 to the enterprise. Here, a web server 460 having an application 462 may communicate with API endpoint 420 via an API 426B of a service interface template 424B. Application 462 may use a data store 422 in addition or as an alternative to data store 422 in mobile network 402. In this arrangement, host 452 of the enterprise may use a web browser 470 with its associated GUI 472 for interfacing with and controlling the enterprise mobile service (via web server 460 and its associated application).

Figure 4C:
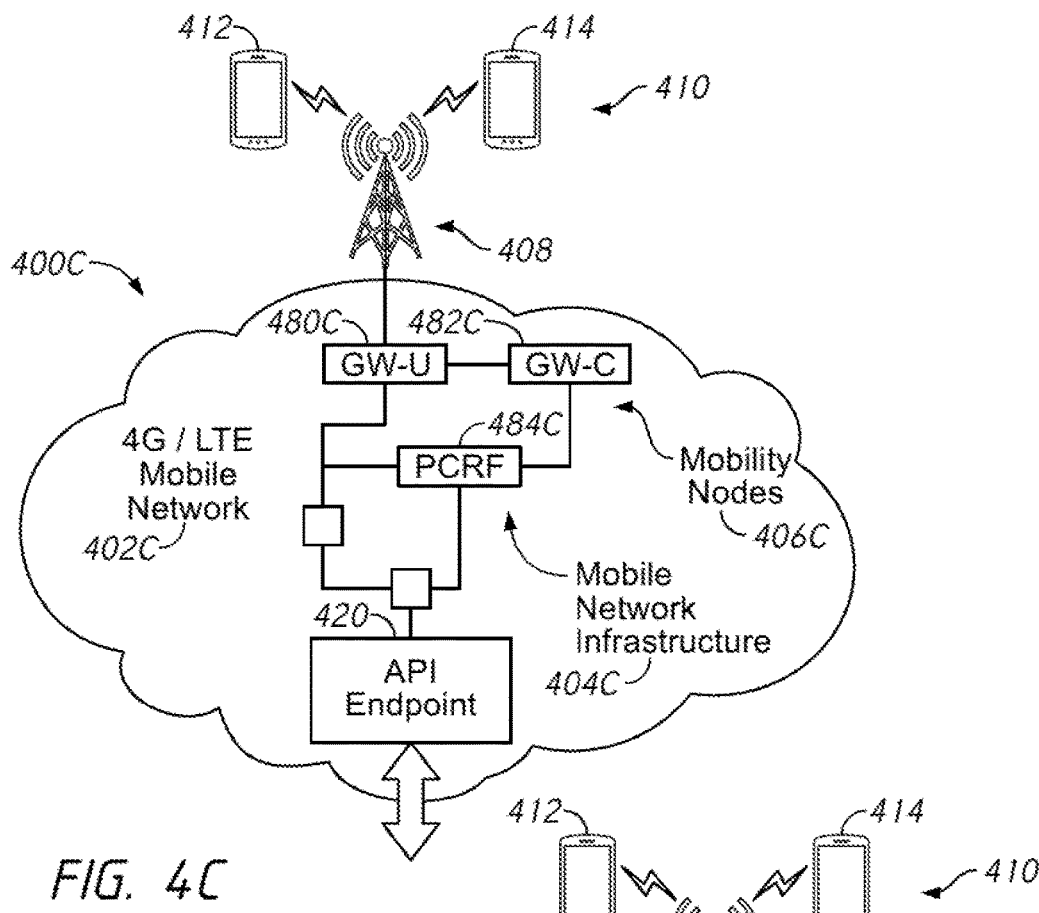
FIG. 4C is an illustrative representation of a mobile network of the system of FIGS. 4A and 4B, where the mobile network includes mobility nodes of a 4G/Long Term Evolution (LTE) based mobile network.

FIG. 4C is an illustrative representation of a system 400C which is the same as systems 400A and 400B or FIGS. 4A and 4B, respectively, further illustrating use of mobility nodes 406C of a mobile network infrastructure 404C which is a 4G/LTE mobile network 402C. Here, a mobility node 480C may be a gateway-user plane (GW-U), a mobility node 482C may be a GW-control plane (GW-C), and a mobility node 484C may be a policy control and rules function (PCRF). One or more of these mobility nodes 480C, 482C, and 484C may be provisioned with parameters in the techniques described herein.

Figure 4D:
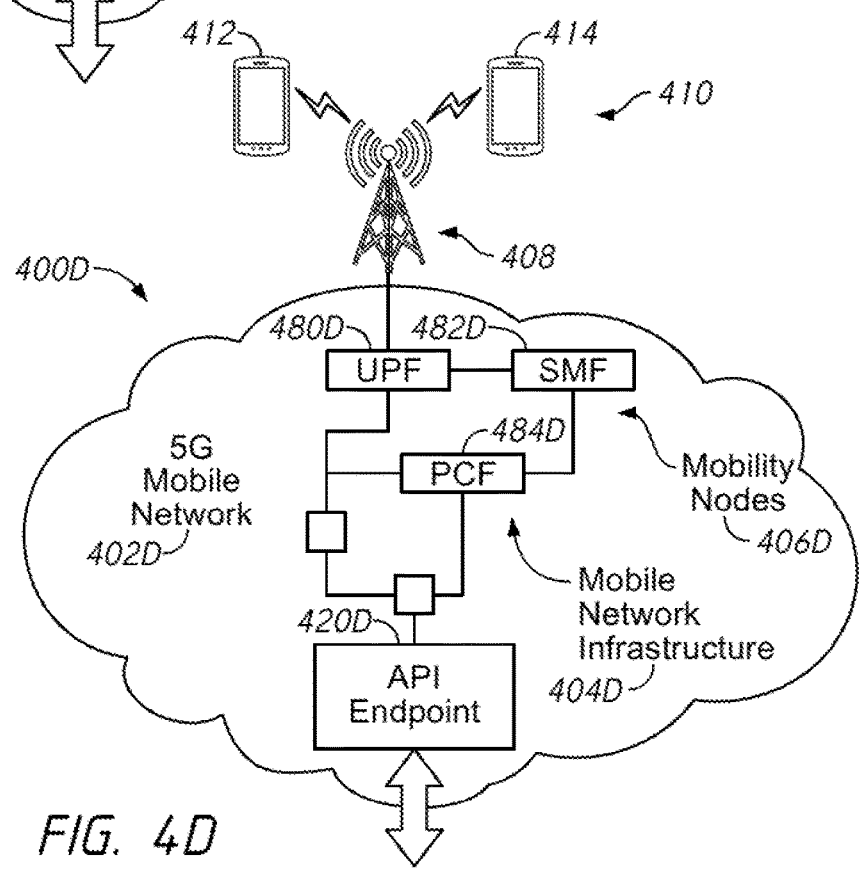
FIG. 4D is an illustrative representation of a mobile network of the system of FIGS. 4A and 4B, where the mobile network includes mobility nodes of a 5G mobile network.

FIG. 4D is an illustrative representation of a system 400D which is also the same as systems 400A and 400B or FIGS. 4A and 4B, respectively, further illustrating use of mobility nodes 406D of a mobile network infrastructure 404D which is a 5G mobile network 402D. Here, a mobility node 480D may be a user plane function (UPF), a mobility node 482D may be a session management function (SMF), and a mobility node 484D may be a policy control function (PCF). Another relevant node for provisioning may be a network exposure function (NEF) of the 5G mobile network. Again, one or more of these mobility nodes 480D, 482D, and 484D (and NEF) may be provisioned with parameters in the techniques described herein.

Figure 5:
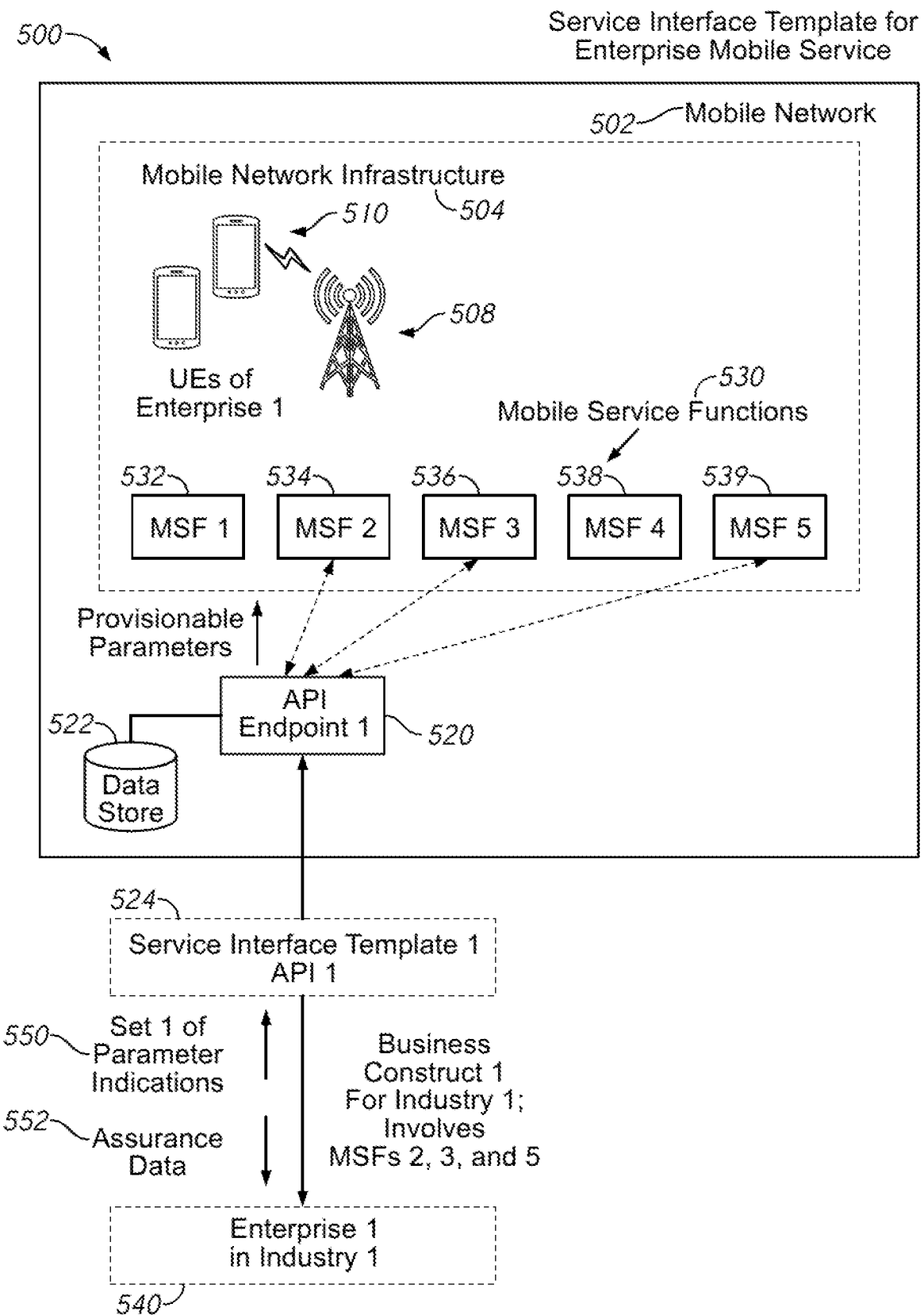
FIG. 5 is an illustrative representation of a system for providing an enterprise mobile service of a mobile network to an enterprise according to some implementations of the present disclosure.

FIG. 5 is another illustrative representation of a system 500 for providing an enterprise mobile service of a mobile network 502 to an enterprise 540, according to some implementations of the present disclosure. In FIG. 5, mobile network 502 has a mobile network infrastructure 504 and one or more base stations 508 which serve a plurality of UEs 510 of the enterprise. Implemented in the mobile network infrastructure 504 of mobile network 502 are a plurality of mobile service functions 530. In FIG. 5, the plurality of mobile service functions 350 include mobile service functions 532, 534, 536, 538, and 539.

Mobile network 502 may provide a service interface template 524 to provide the enterprise mobile service for enterprise 540. The service interface template 524 may involve an API 524 at an API endpoint 520 for enterprise exposure and control over (e.g. provisioning) at least a subset of mobile service functions 530 for use in relation to UEs 510 of the enterprise. Here, the subset of mobile service functions 530 include mobile service functions 534, 536, and 539. This subset of the mobile service functions may represent a business construct of the enterprise 540 which is in "Industry 1."

API 524 may be defined at least in part by one or more API request types to perform one or more operations in relation to a plurality of resources of a data store 522. For example, the API may be defined at least in part by one or more API request types to perform one or more operations for creating, reading, updating, and deleting at least some of the plurality of resources in the data store 522. In some implementations, a change in a resource in the data store 522 may be used to trigger a provisioning or re-provisioning of an associated mobile network function.

API endpoint 520 of FIG. 5 may be provided with the same or similar additional API request types, resources, and/or indications as well as associated functionalities as described earlier above in relation to FIG. 4A. Notably, enterprise 540 may communicate with API endpoint 520 via API 524 to send it parameter indications 550 in order to provision at least some of the mobile service functions 534, 536, and 539 with provisionable parameters. Enterprise 540 may also communicate with API endpoint 520 via API 524 to receive assurance data 552 in order to identify conformance or non-conformance.

Figure 6:
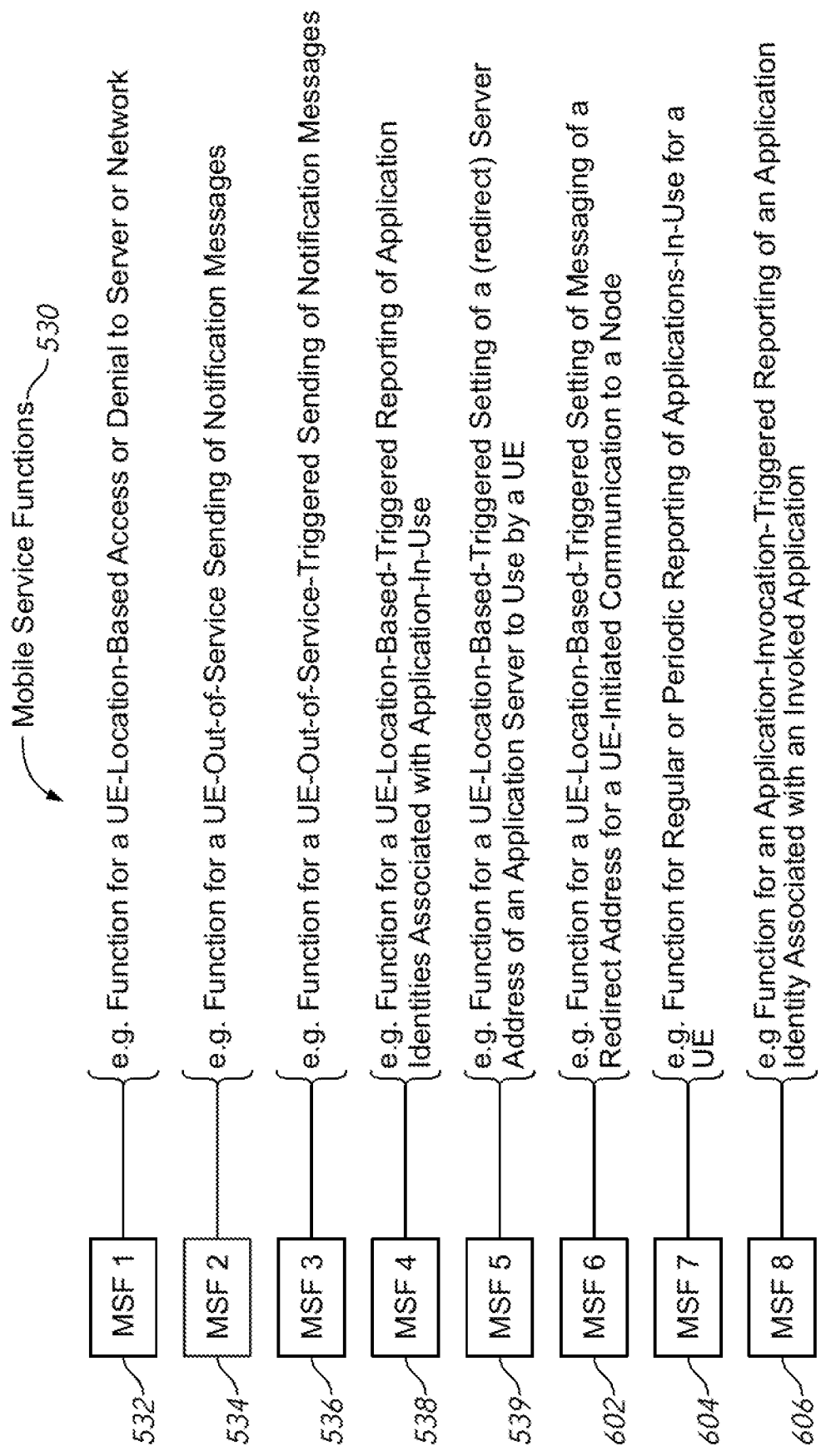
FIG. 6 are examples of a plurality of mobile service functions which may be implemented in a mobile network for one or more enterprise mobile services according to some implementations of the present disclosure.

FIG. 6 are examples of mobile service functions 530 which may be implemented in a mobile network for an enterprise mobile service according to some implementations of the present disclosure. As indicated, MSF 532 may be a function for UE-location-based access or denial to server or network. MSF 534 may be a function for a UE-location-based-triggered sending of notification messages. MSF 536 may be a function for a UE-out-of-service-triggered sending of notification messages. MSF 538 may be a function for a UE-location-based-triggered reporting of application identities associated with application-in-use. MSF 539 may be a function for a UE-location-based-triggered setting of a (redirect) server address of an application server to use by a UE. MSF 602 may be a function for a UE-location-based-triggered sending of messaging of a redirect address for a UE-initiated communication to a node. MSF 604 may be a function for regular or periodic reporting of applications-in-use for a UE. MSF 606 may be a function for an application-invocation-triggered reporting of an application identity associated with an invoked application. Other functions are realizable, including a reporting of a UE roaming to network x, a reporting of a UE attachment at network y, etc.

Figure 7:
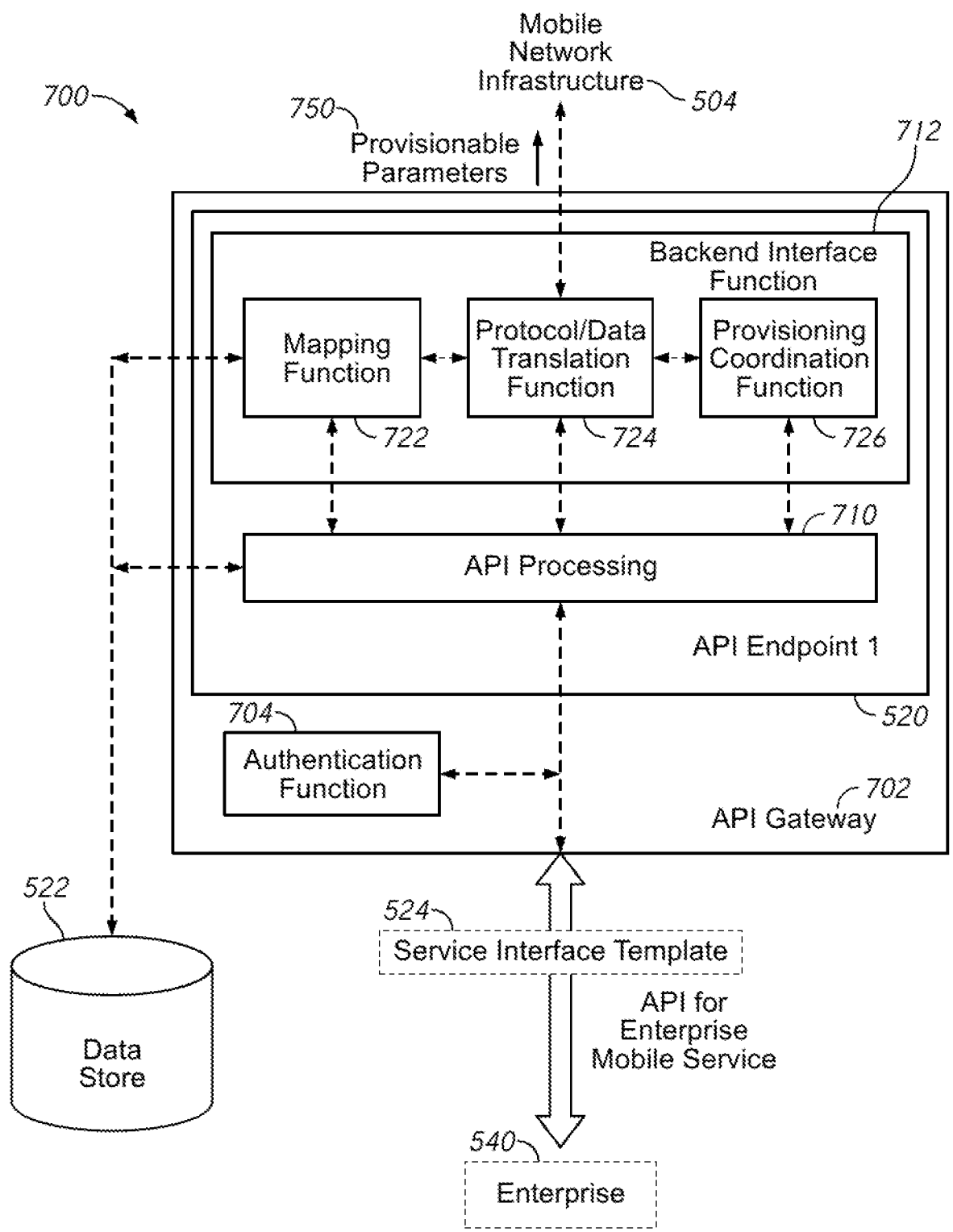
FIG. 7 is a schematic block diagram of an API endpoint included as part of an API gateway according to some implementations of the present disclosure.

FIG. 7 is a schematic block diagram 700 of API endpoint 520 included as part of an API gateway 702 according to some implementations of the present disclosure. Schematic block diagram 700 includes some of the same or similar components as system 500 shown in FIG. 5. Further, API gateway 702 is shown to include an authentication function 704 for authentication of enterprise 504 for access (also e.g. for authorization). Authentication function 704 may be for use with a single API endpoint 703 of the enterprise, or alternatively, for use with multiple API endpoints at the API gateway 702 for multiple enterprises.

API endpoint 520 is shown to further include an API processing function 710 and a backend interface function 712. API processing function 710 may be configured to handle and process API requests of various request types, for example, to perform operations in relation to the plurality of resources of in data store 522. The API request types may include creating, reading, updating, and deleting in relation to the plurality of resources in data store 522. API processing function 710 may function according to the same or similar additional API request types, resources, and/or indications as well as associated functionalities as described earlier above in relation to FIG. 4A.

Backend interface function 712 may be included at or with API gateway 702. Backend interface function 712 may include one or more of a mapping function 722, a protocol/data translation function 724, and a provisioning coordinating function 726. Backend interface function 712 may be provided for a single API endpoint 710 for a single enterprise, or alternatively, it may be shared amongst multiple API endpoints for use with multiple enterprises.

Mapping function 722 of the backend interface may be configured to interface with data store 522 and provide mappings between enterprise-side-data and mobile-network-side data (e.g. selectable parameter elements of the enterprise and provisionable parameters of the mobile network, with selective retrieval of data based on such mappings). Protocol/data translation function 724 of the backend interface may be configured to provide general protocol and data translation between enterprise-side and mobile-network-side communications (e.g. processing the communication of any information regularly received data through use of one or more mobile service functions, and/or processing the communication of any information regularly received assurance data, etc.).

Provisioning coordination function 726 of the backend interface may be configured to handle provisioning coordination in the mobile network in response to provisioning needs from the enterprise. For example, a change in a resource in the data store 522 may be used to trigger a provisioning or re-provisioning of an associated mobile network function. As additional examples, provisioning or re-provisioning may be triggered where the API is defined at least in part by one or more API request types to perform one or more operations which may include one or more provisioning request types (e.g. for provisioning a mobile service function according to a selected parameter indication), and/or one or more assignment request types (e.g. for assignment or association of an identity, type, etc., to a mobile service function). In some implementations, a timer or periodic timer may be used to trigger a provisioning or re-provisioning of a mobile service function.

Mappings, translations, associations, assignments, and other interfacings of and between enterprise-side and mobile-network-side items may also be provided for according to the techniques and examples shown and described later in relation to the figures (e.g. FIGS. 10-11, 19-21, etc.).

Figure 8:
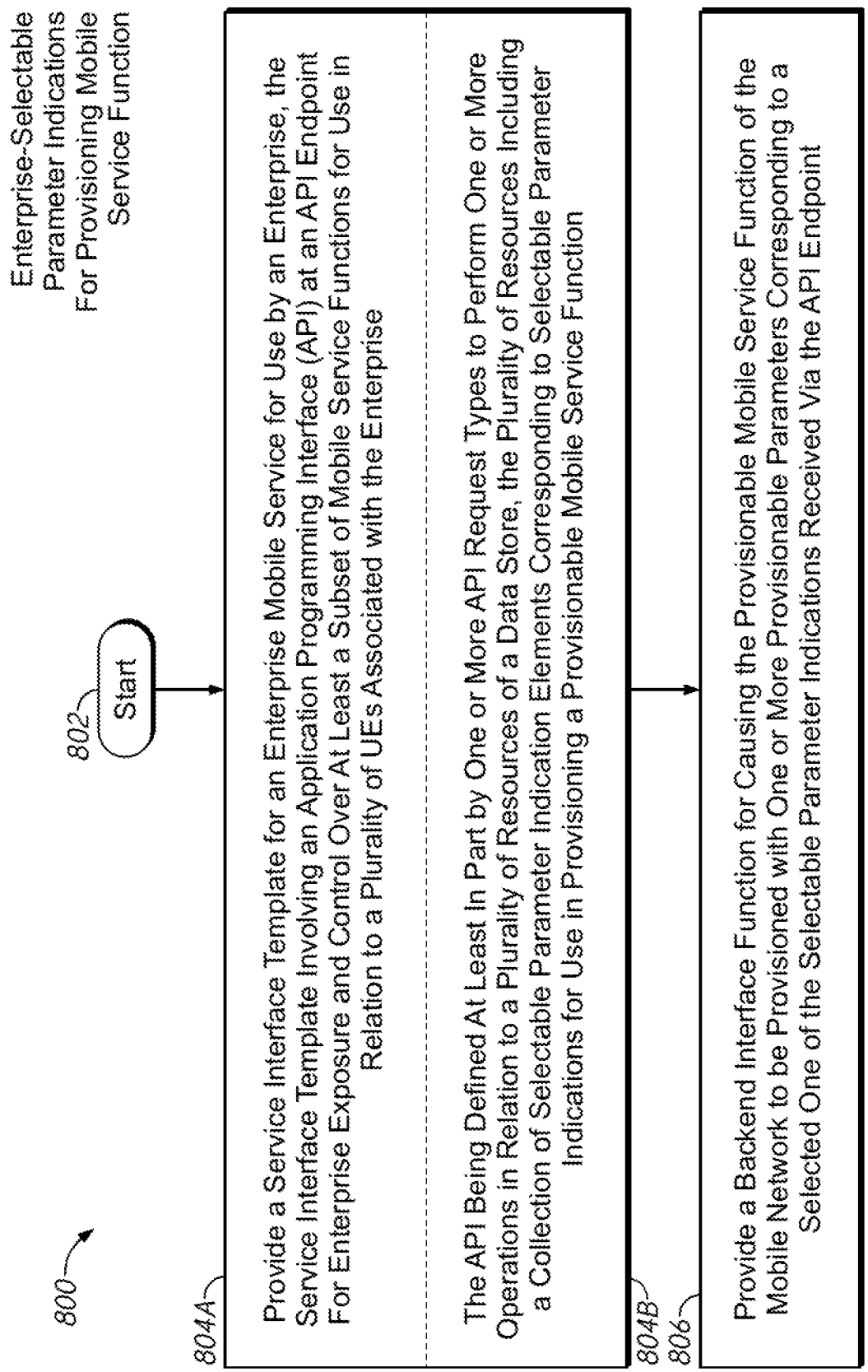
FIG. 8 is a flowchart for describing a method of providing an enterprise mobile service of a mobile network according to some implementations of the present disclosure (see e.g.

FIG. 8 is a flowchart for describing a method of providing an enterprise mobile service according to some implementations of the present disclosure. The method may be implemented in a mobile network which is configured to provide communications for UEs and include a plurality of mobile service functions.

Beginning at a start block 802 of FIG. 8, a service interface template for an enterprise mobile service may be provided by a mobile network for use by an enterprise (step 804A of FIG. 8). The service interface template may involve an API at an API endpoint for enterprise exposure and control over (at least) a subset of the mobile service functions for use in relation to a plurality of UEs associated with the enterprise.

In some implementations, the set or subset of the mobile service functions may represent a business construct of the enterprise. The enterprise mobile service may be a contracted enterprise mobile service which is contracted based on the service interface template (e.g. the number and type of services, the number of members involved, the number of communications).

The API may be defined at least in part by one or more API request types to perform one or more operations in relation to a plurality of resources of a data store (step 804B of FIG. 8). The plurality of resources may include a collection of selectable parameter indication elements corresponding to selectable parameter indications for use in provisioning a provisionable mobile service function of the subset. For example, selectable parameter indications may include selectable geographic area indications, selectable bandwidth indications, selectable latency indications, and selectable communication quality indications, and others.

A backend interface function may be also provided at or with the API endpoint for causing the provisionable mobile service function of the mobile network to be provisioned and/or executed with one or more provisionable parameters corresponding to a selected one of the selectable parameter indications received via the API endpoint (step 806 of FIG. 8).

In some implementations, the API may be defined at least in part by one or more API request types to perform one or more operations for creating, reading, updating, and/or deleting at least some of the plurality of resources in the data store, and a change in a resource in the data store may be used to trigger a provisioning or re-provisioning of an associated mobile network function.

Also in some implementations, the API may be defined at least in part by one or more API request types which may include one or more provisioning request types (e.g. for provisioning a mobile service function according to a selected parameter indication) and/or one or more assignment request types (e.g. for assignment or association of an identity, type, etc., to a mobile service function), and corresponding requests may be used to trigger a provisioning or re-provisioning of an associated mobile network function.

Figure 9:
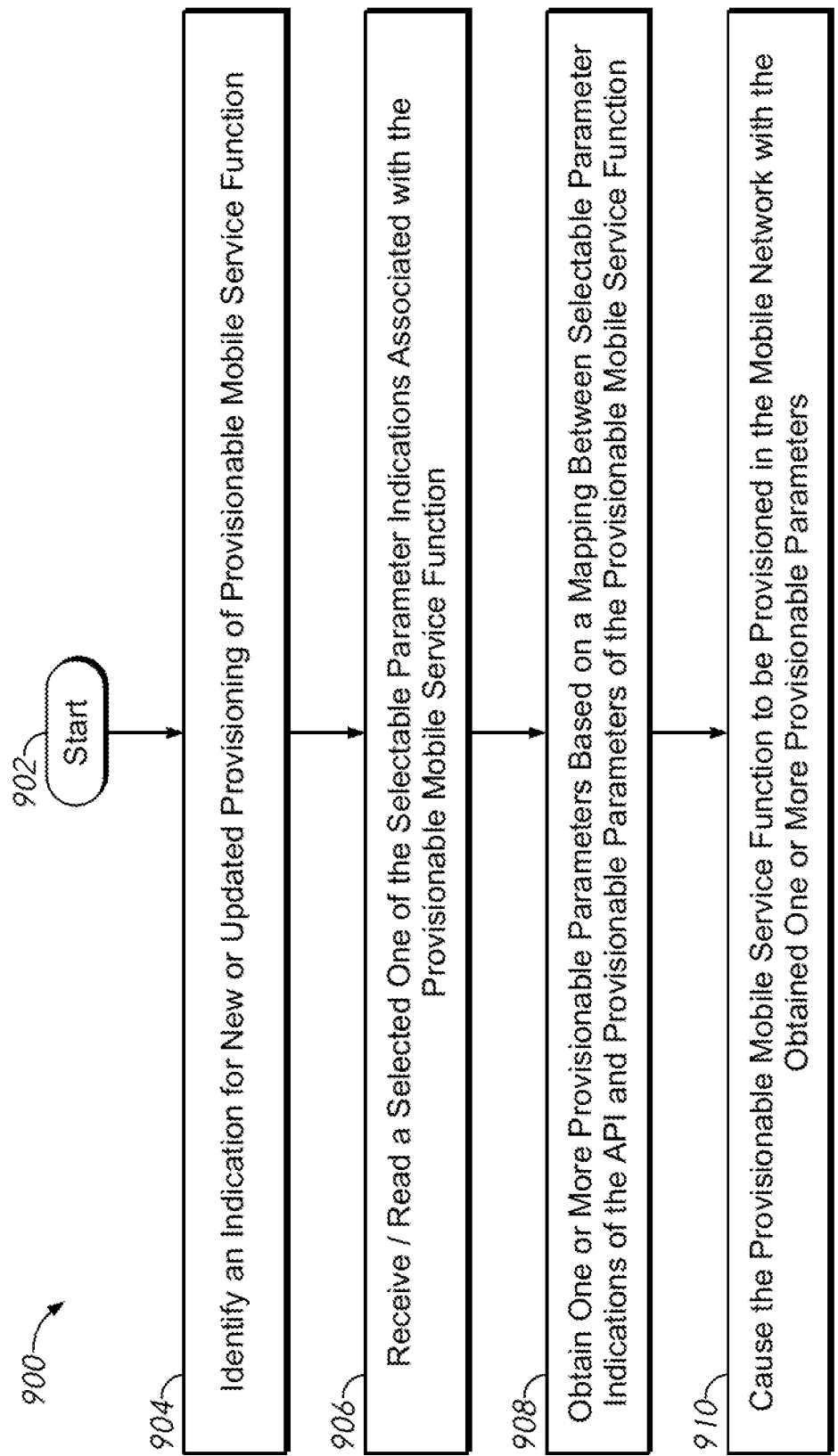
FIG. 9 is flowchart for describing a method for use in causing a provisioning of a provisionable mobile service function in a mobile network for an enterprise mobile service according to some implementations of the present disclosure.

FIG. 9 is flowchart 900 for describing a method for use in causing a provisioning of a mobile service function in a mobile network for an enterprise mobile service according to some implementations of the present disclosure. The method may be performed at an API endpoint (e.g. API endpoint 520 of FIG. 7) used by the enterprise. Beginning at a start block 902 of FIG. 9, an indication that a new or updated provisioning of a provisionable mobile service function may be identified (step 904 of FIG. 9). A suitable trigger may be used as such an indication as described. A selected one of a selectable parameter indications associated with a provisionable mobile service function may be received or read (step 906 of FIG. 9). The selection may have been received at the API endpoint from the enterprise. One or more provisionable parameters may be obtained or retrieved based on a mapping between selectable parameter indications of the API and provisionable parameters of the provisionable mobile service function (step 908 of FIG. 9). A mapping function at the API endpoint may be utilized for this purpose. The provisionable mobile service function may then be provisioned in the mobile network with the obtained or retrieved one or more provisionable parameters (step 910 of FIG. 9).

Figure 10:
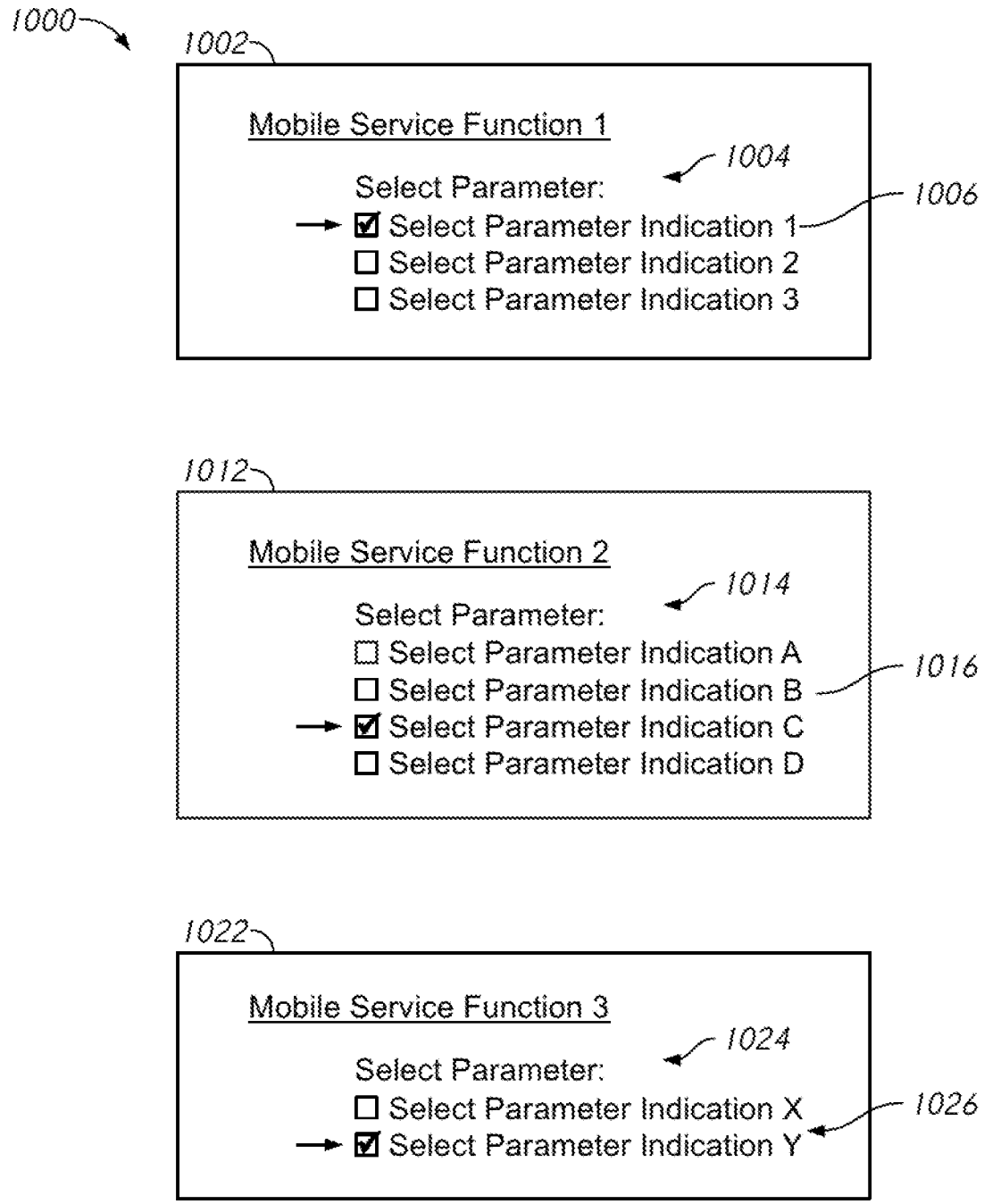
FIG. 10 is an illustrative representation of a plurality of selectable parameter indications (e.g. as viewed from a GUI of the enterprise) according to some implementations of the present disclosure.

FIG. 10 is an illustrative representation 1000 of a plurality of selectable parameter indications (e.g. as viewed from a GUI of the enterprise) according to some implementations of the present disclosure. A mobile service function 1002 may be associated with a plurality of selectable parameter indications 1004 (i.e. selectable parameter indications 1, 2, 3); the enterprise may select one of these selectable parameter indications 1006 (i.e. selectable parameter indication 1) so that mobile service function 1002 is provisioned in the mobile network based on such indication. On the other hand, a mobile service function 1012 may be associated with a plurality of selectable parameter indications 1014 (i.e. selectable parameter indications A, B, C, and D); the enterprise may select one of these selectable parameter indications 1016 (i.e. selectable parameter indication C) so that mobile service function 1012 is provisioned in the mobile network based on such indication. Finally, a mobile service function 1022 may be associated with a plurality of selectable parameter indications 1024 (i.e. selectable parameter indications X and Y); the enterprise may select one of these selectable parameter indications 1026 (i.e. selectable parameter indication Y) so that mobile service function 1022 is provisioned in the mobile network based on such indication.

FIG. 11 is an illustrative representation 1100 of specific examples of a plurality of selectable parameter indications (e.g. as viewed from a GUI of the enterprise) according to some implementations of the present disclosure. A mobile service function 1102 may be associated with a plurality of selectable parameter indications 1104 that pertain to a location area 1. The plurality of selectable parameter indications 1104 include "West Coast," "South West," Midwest," "East Coast," "All Other," and "All Locations." The enterprise may select one of these selectable parameter indications (i.e. selectable parameter indication 1106 or "South West") so that mobile service function 1102 is provisioned in the mobile network based on such indication.

Also in FIG. 11, a mobile service function 1112 may be associated with a plurality of selectable parameter indications 1114 that pertain to a location area 2. The plurality of selectable parameter indications 1112 include "North Side (Chicago), "South Side (Chicago), and "All Other." The enterprise may select one of these selectable parameter indications (i.e. selectable parameter indication 1116 or "South Side (Chicago)") so that mobile service function 1112 is provisioned in the mobile network based on such indication.

Further in FIG. 11, a mobile service function 1122 may be associated with a plurality of selectable parameter indications 1124 that pertain to a bandwidth or throughput. The plurality of selectable parameter indications 1124 include "Normal/Medium," "High,", and "No Limit." The enterprise may select one of these selectable parameter indications (i.e. selectable parameter indication 1126 or "High") so that mobile service function 1122 is provisioned in the mobile network based on such indication.

Finally in FIG. 11, a mobile service function 1132 may be associated with a plurality of selectable parameter indications 1134 that pertain to a time period (e.g. for periodic uploading or reporting). The plurality of selectable parameter indications 1134 include "30 minutes," "1 hour," "8 hours," and "1 day." The enterprise may select one of these selectable parameter indications (i.e. selectable parameter indication 1136 or "1 hour") so that mobile service function 1132 is provisioned in the mobile network based on such indication.

According to some implementations of the present disclosure, the same service interface template may be used by different enterprises (e.g. when the different enterprises are in the same industry).

Figure 12:
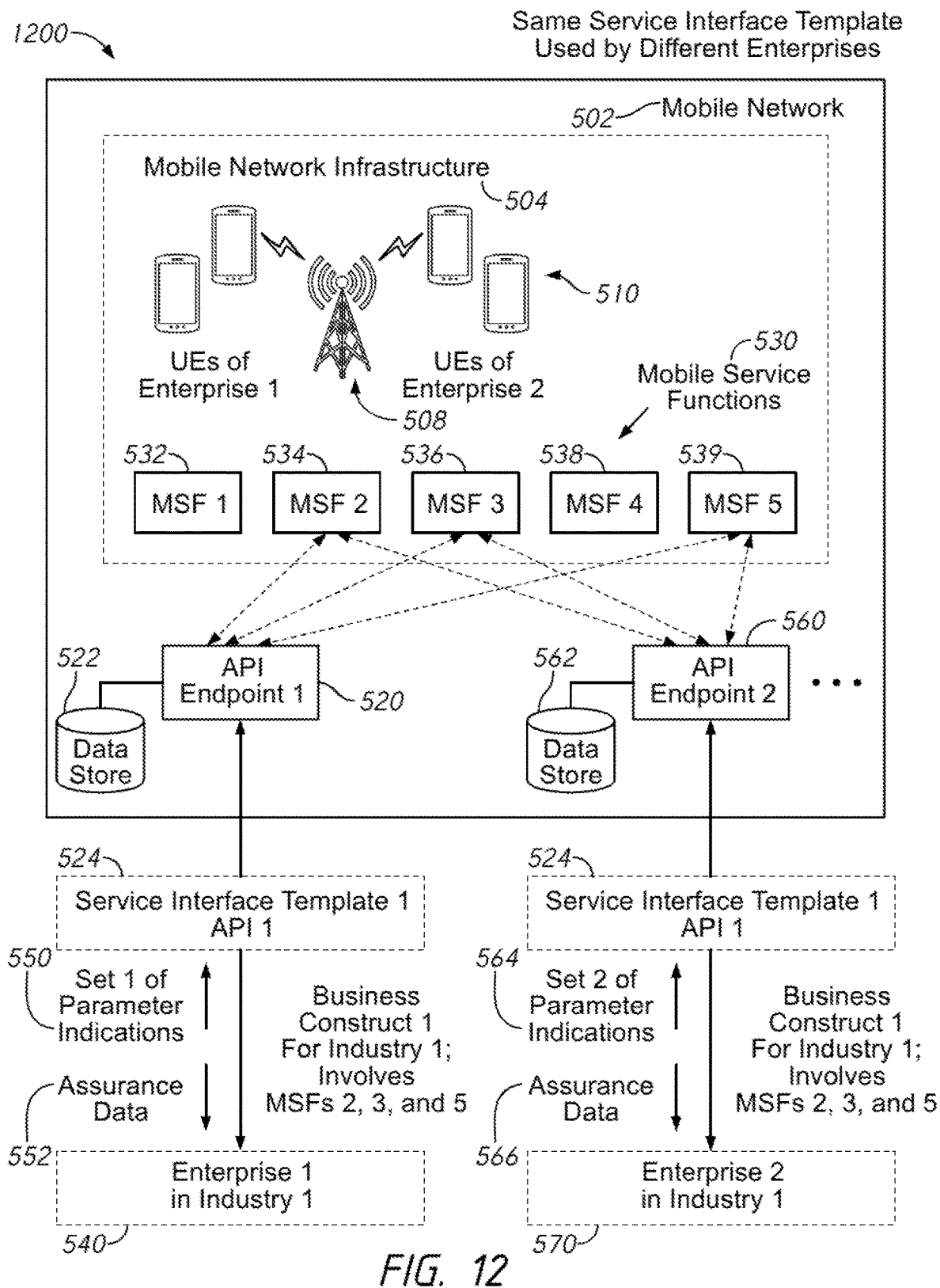
FIG. 12 is an illustrative representation of a system for providing enterprise mobile services of a mobile network to two or more enterprises (e.g. of the same or similar industry) using the same service interface template.

To better illustrate, FIG. 12 is an illustrative representation of a system 1200 for providing enterprise mobile services of mobile network 502 to two or more enterprises 540 and 570 (e.g. of the same or similar industry) using the same service interface template. The system 1200 of FIG. 12 is the same as or similar to that shown and described in relation to FIG. 5, but with the additional implementation of an API endpoint 560 and its associated data store 562 for enterprise 570 to utilize the same service interface template 524 and API. The subset of mobile service functions 530 used by enterprises 540 and 5470 include mobile service functions 534, 536, and 539; this subset of mobile service functions represents the same business construct of both enterprises 540 and 570 in "Industry 1."

API endpoint 560 of FIG. 12 may be provided with the same or similar additional API request types, resources, and/or indications as well as associated functionalities as described earlier above in relation to FIG. 4A. Notably, enterprise 570 may communicate with API endpoint 560 via the API to send it parameter indications 564 in order to provision at least some of the mobile service functions 534, 536, and 539 with provisionable parameters. Enterprise 570 may also communicate with API endpoint 560 via the API to receive assurance data 566 in order to identify conformance.

Figure 13:
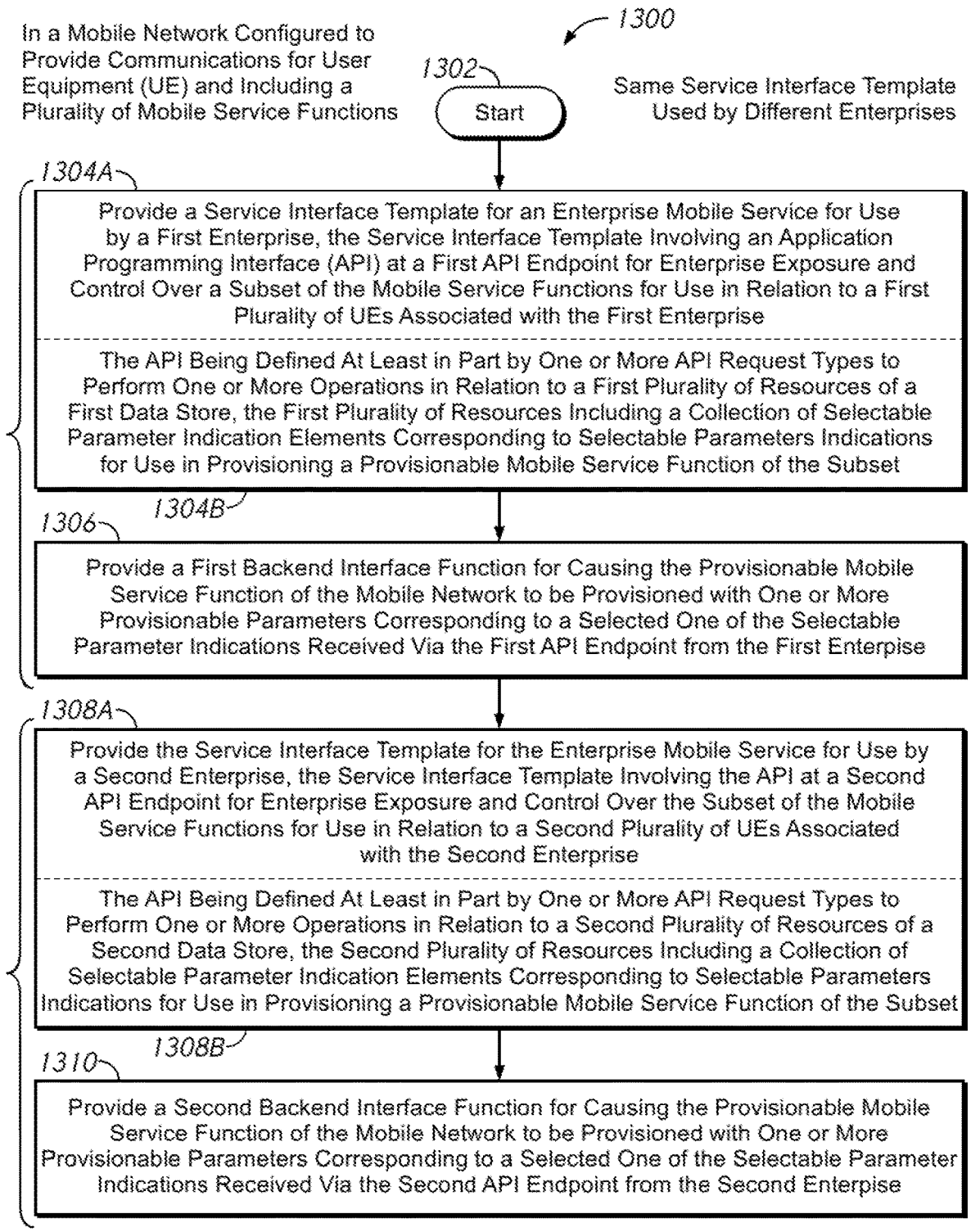
FIG. 13 is a flowchart for describing a method of providing enterprise mobile services of a mobile network to two or more enterprises (e.g. of the same or similar industry) using the same service interface template (see e.g.

FIG. 13 is a flowchart 1300 for describing a method of providing enterprise mobile services of a mobile network to two or more enterprises (e.g. of the same or similar industry) using the same service interface template (see e.g. FIG. 12). The method may be implemented in a mobile network which is configured to provide communications for UEs and include a plurality of mobile service functions.

Beginning at a start block 1302 of FIG. 13, a service interface template for an enterprise mobile service may be provided for use by a first enterprise (step 1304 of FIG. 13). The service interface template involves an API at a first API endpoint for enterprise exposure and control over a subset of the mobile service functions for use in relation to a first plurality of UEs associated with the first enterprise. The API may be defined at least in part by one or more API request types to perform one or more operations in relation to a first plurality of resources of a first data store (step 1304B of FIG. 13). The first plurality of resources may include a collection of selectable parameter indication elements corresponding to selectable parameter indications for use in provisioning a provisionable mobile service function of the subset. A first backend interface function may be provided for causing the provisionable mobile service function of the mobile network to be provisioned and/or executed with one or more provisionable parameters corresponding to a selected one of the selectable parameter indications received via the first API endpoint from the first enterprise (step 1306 of FIG. 13).

In addition, the service interface template for the enterprise mobile service may be provided for use by a second enterprise (step 1308A of FIG. 13). The service interface template involves the API at a second API endpoint for enterprise exposure and control over the subset of the mobile service functions for use in relation to a second plurality of UEs associated with the second enterprise. The API may be defined at least in part by one or more API request types to perform one or more operations in relation to a second plurality of resources of a second data store (step 1308B of FIG. 13). The second plurality of resources may include a collection of selectable parameter indication elements corresponding to selectable parameter indications for use in provisioning the provisionable mobile service function of the subset. A second backend interface function may be provided for causing the provisionable mobile service function of the mobile network to be provisioned with one or more provisionable parameters corresponding to a selected one of the selectable parameter indications received via the second API endpoint from the second enterprise (step 1310 of FIG. 13).

In some implementations of the method of FIG. 13, the same backend interface may be used with the first and the second API endpoints (i.e. the first and the second backend interfaces are the same).

According to some implementations of the present disclosure, the different service interface templates may be used by different enterprises (e.g. when the different enterprises are in different industries).

Figure 14:
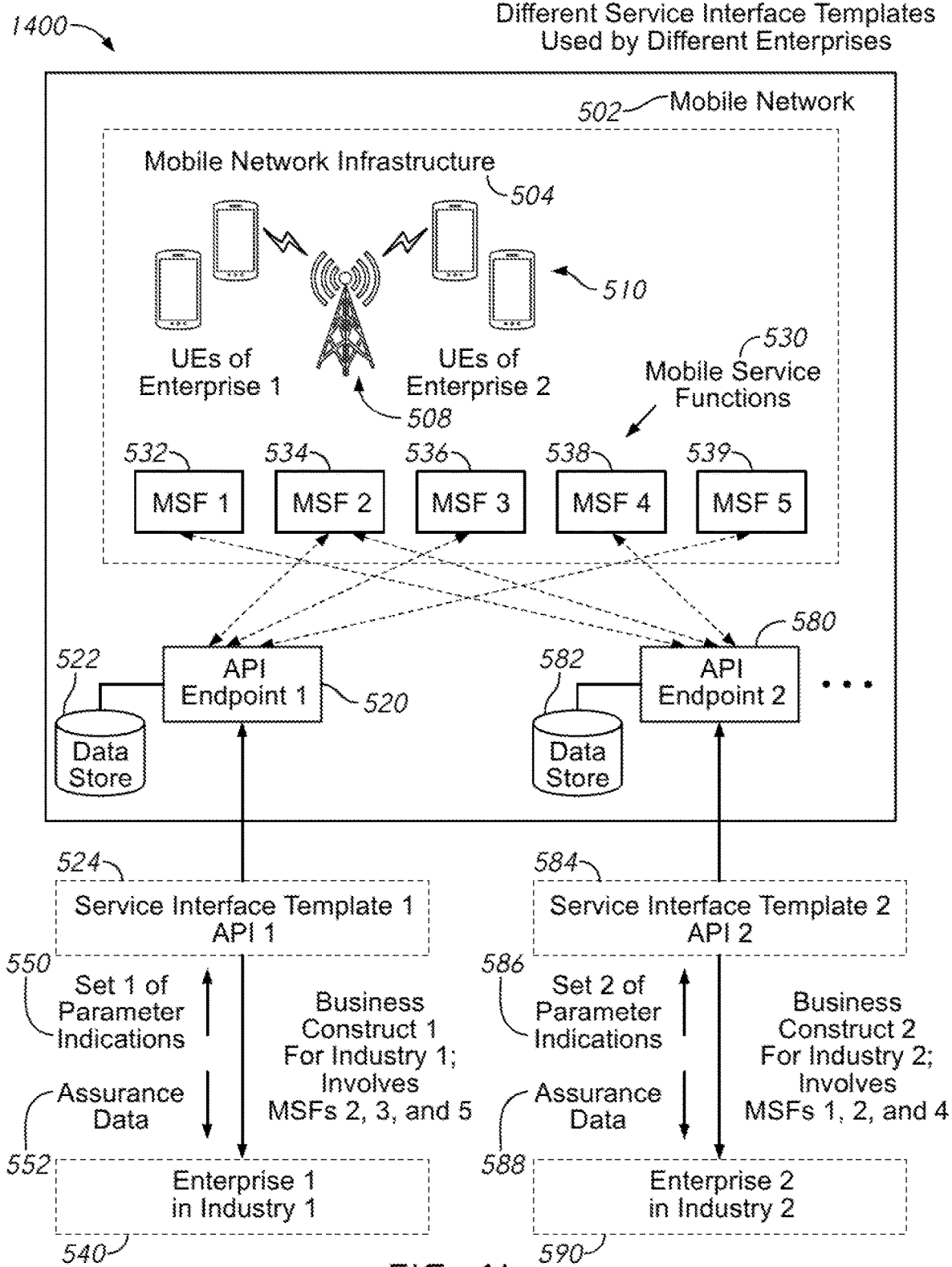
FIG. 14 is an illustrative representation of a system for providing enterprise mobile services of a mobile network to two or more enterprises (e.g. of different industries) using different service interface templates.

To better illustrate, FIG. 14 is an illustrative representation of a system 1400 for providing enterprise mobile services of mobile network 502 to two or more enterprises 540 and 590 (e.g. of different industries) using different service interface templates. The system 1400 of FIG. 14 is the same as or similar to that shown and described in relation to FIG. 5, but with the additional implementation of an API endpoint 580 and its associated data store 582 for enterprise 590 to utilize a different service interface template 584 and API.

Here, the (first) subset of mobile service functions 530 used by enterprise 540 include mobile service functions 534, 536, and 539; this subset of mobile service functions represents a business construct of enterprise 540 in "Industry 1." On the other hand, the (second) subset of mobile service functions 530 used by enterprise 590 include mobile service functions 532, 534, and 538; this subset of mobile service functions represents a business construct of enterprise 590 in "Industry 2."

API endpoint 580 of FIG. 14 may be provided with the same or similar additional API request types, resources, and/or indications as well as associated functionalities as described earlier above in relation to FIG. 4A. Notably, enterprise 590 may communicate with API endpoint 580 via the API to send it parameter indications 586 in order to provision at least some of the mobile service functions 532, 534, and 538 with provisionable parameters. Enterprise 590 may also communicate with API endpoint 580 via the API to receive assurance data 588 in order to identify conformance.

Figure 15:
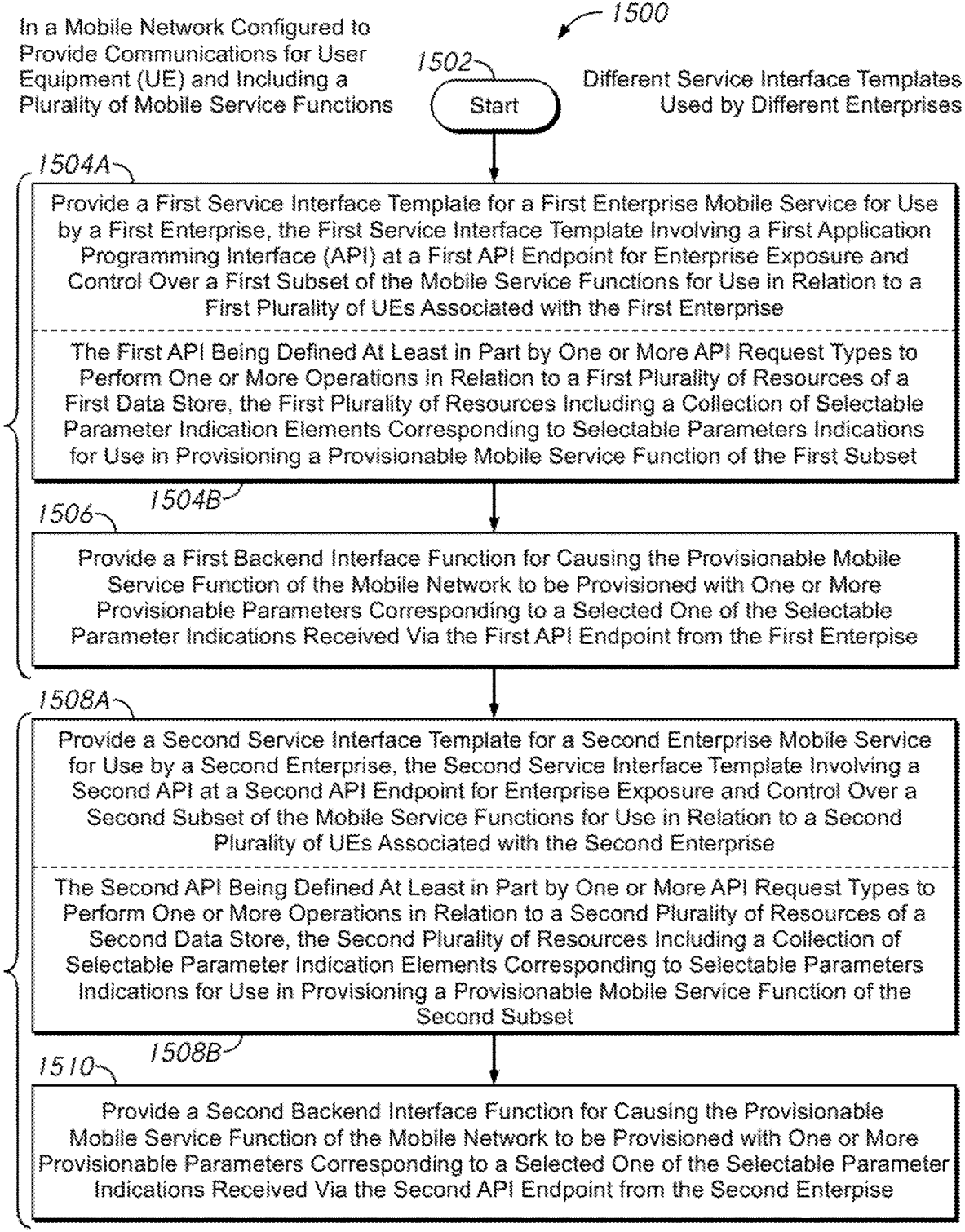
FIG. 15 is a flowchart for describing a method of providing enterprise mobile services of a mobile network to two or more enterprises (e.g. of different industries) using different service interface templates (see e.g.

FIG. 15 is a flowchart 1500 for describing a method of providing enterprise mobile services of a mobile network to two or more enterprises (e.g. of different industries) using different service interface templates (see e.g. FIG. 14) according to some implementations of the present disclosure. The method may be implemented in a mobile network which is configured to provide communications for UEs and include a plurality of mobile service functions.

Beginning at a start block 1502 of FIG. 15, a first service interface template for a first enterprise mobile service may be provided for use by a first enterprise (step 1504A of FIG. 15). The first service interface template involves a first API at a first API endpoint for enterprise exposure and control over a first subset of the mobile service functions for use in relation to a first plurality of UEs associated with the first enterprise. The first API may be defined at least in part by one or more API request types to perform one or more operations in relation to a first plurality of resources of a first data store (step 1504B of FIG. 15). The first plurality of resources may include a collection of selectable parameter indication elements corresponding to selectable parameter indications for use in provisioning a first provisionable mobile service function of the first subset. A first backend interface function may be provided for causing the first provisionable mobile service function of the mobile network to be provisioned with one or more provisionable parameters corresponding to a selected one of the selectable parameter indications received via the first API endpoint from the first enterprise (step 1506 of FIG. 15).

A second service interface template for a second enterprise mobile service may be provided for use by a second enterprise (step 1508A of FIG. 15). The second service interface template involves a second API at a second API endpoint for enterprise exposure and control over a second subset of the mobile service functions for use in relation to a second plurality of UEs associated with the second enterprise. The second API may be defined at least in part by one or more API request types to perform one or more operations in relation to a second plurality of resources of a second data store (step 1508B of FIG. 15). The second plurality of resources may include a collection of selectable parameter indication elements corresponding to selectable parameter indications for use in provisioning the provisionable mobile service function of the subset. A second backend interface function may be provided for causing the second provisionable mobile service function of the mobile network to be provisioned with one or more provisionable parameters corresponding to a selected one of the selectable parameter indications received via the second API endpoint from the second enterprise (step 1510 of FIG. 15).

In some implementations of the method of FIG. 13, the same backend interface may be used with the first and the second API endpoints (i.e. the first and the second backend interfaces are the same).

Figure 16:
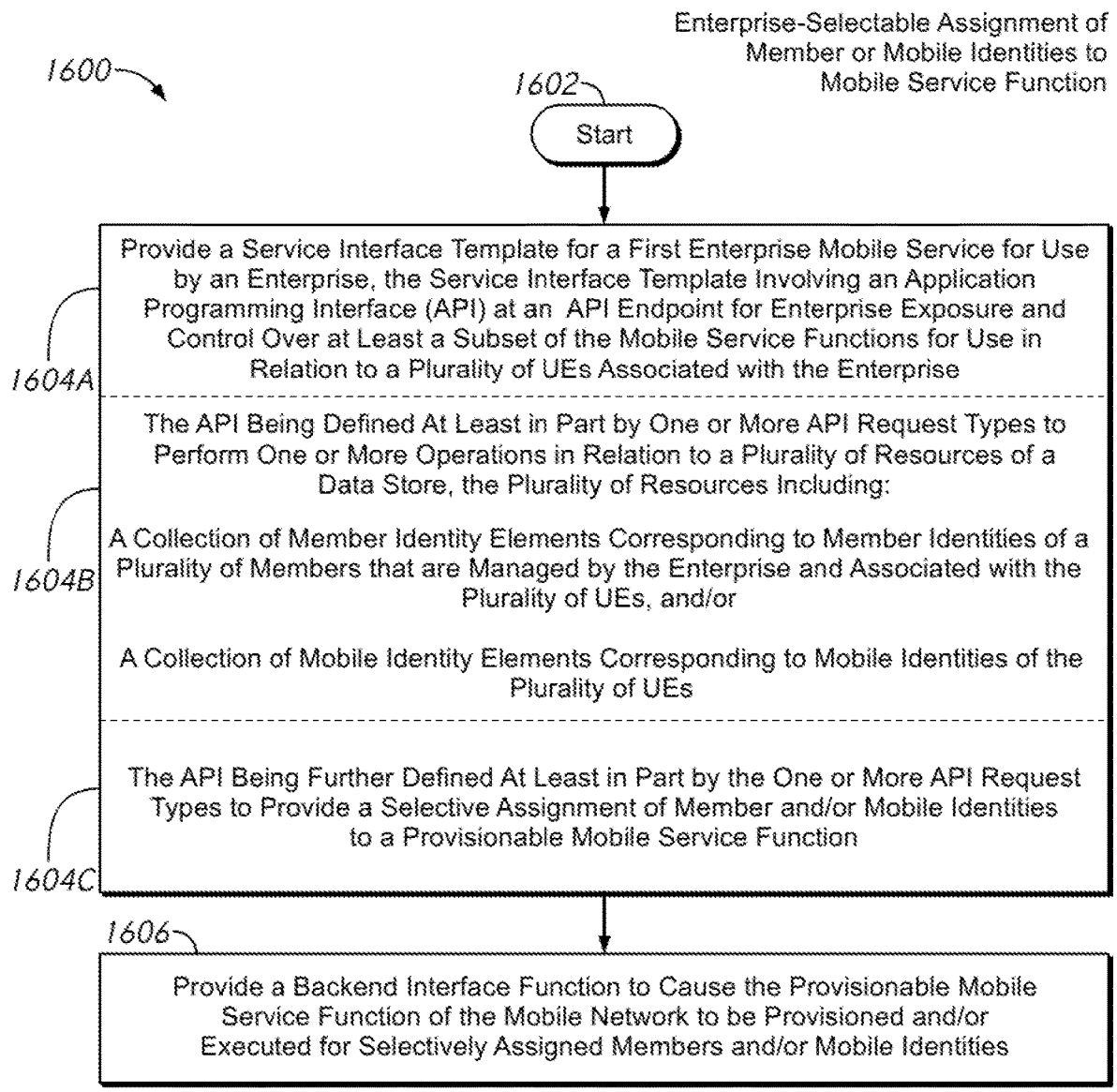
FIG. 16 is a flowchart for describing a method of providing an enterprise mobile service of a mobile network with selectively assignable member or mobile identities for assignment to a mobile service function according to some implementations of the present disclosure.

FIG. 16 is a flowchart 1600 for describing a method of providing an enterprise mobile service of a mobile network with selectively assignable member or mobile identities for assignment to a mobile service function according to some implementations of the present disclosure. Again, the method may be implemented in a mobile network which is configured to provide communications for UEs and include a plurality of mobile service functions.

Beginning at a start block 1602 of FIG. 16, a service interface template may be provided by a mobile network for an enterprise mobile service for use by an enterprise (step 1604A of FIG. 16). The service interface template may involve an API at an API endpoint for enterprise exposure and control over a subset of the mobile service functions for use in relation to a plurality of UEs associated with the enterprise.

The API may be defined at least in part by one or more API request types to perform one or more operations in relation to a plurality of resources of a data store (step 1604B of FIG. 16). The plurality of resources operated on may include a collection of member identity elements corresponding to member identities of a plurality of members that are managed by the enterprise and associated with the plurality of UEs. In addition, or as an alternative, the plurality of resources operated on a collection of mobile identity elements corresponding to mobile identities of the plurality of UEs. The member identities may be, for example, member names of members (e.g. employees), member numbers, or the like; the mobile identities may be, for example, mobile telephone numbers or MSISDNs, IP addresses, or the like.

The API may be further defined at least in part by the one or more API request types to perform the one or more operations in relation to the plurality of resources of the data store, to provide a selective assignment of member and/or mobile identities to a provisionable mobile service function (step 1604C of FIG. 16).

A backend interface function may also be provided at or with the API endpoint to cause the provisionable mobile service function of the mobile network to be provisioned and/or executed for selectively assigned members and/or mobile identities (step 1604 of FIG. 16).

Figure 17:
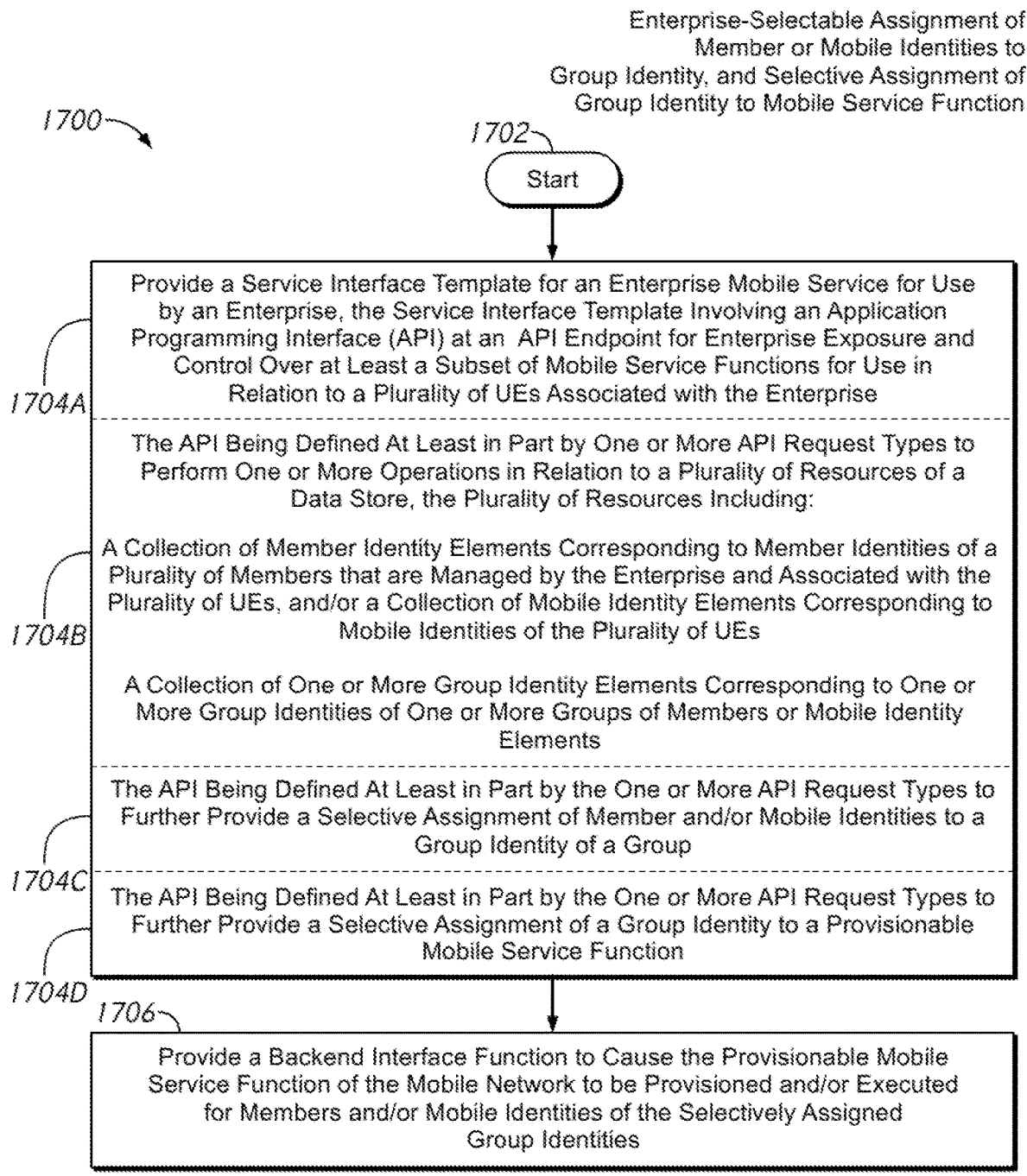
FIG. 17 is a flowchart for describing a method of providing an enterprise mobile service of a mobile network with selectively-assignable group identities for assignment to a mobile service function according to some implementations of the present disclosure.

FIG. 17 is a flowchart 1700 for describing a method of providing an enterprise mobile service of a mobile network with selectively-assignable group identities for assignment to a mobile service function according to some implementations of the present disclosure. Again, the method may be implemented in a mobile network which is configured to provide communications for UEs and include a plurality of mobile service functions.

Beginning at a start block 1702 of FIG. 17, a service interface template for an enterprise mobile service may be provided for use by an enterprise (step 1704A of FIG. 17). The service interface template may an API at an API endpoint for enterprise exposure and control over a subset of the mobile service functions for use in relation to a plurality of UEs associated with the enterprise (step 1704B of FIG. 17). The API may be defined at least in part by one or more API request types to perform one or more operations in relation to a plurality of resources of a data store.

The plurality of resources operated on may include a collection of member identity elements corresponding to member identities of a plurality of members that are managed by the enterprise and associated with the plurality of UEs, and/or a collection of mobile identity elements corresponding to mobile identities of the plurality of UEs. The plurality of resources operated on may further include a collection of one or more group identity elements corresponding to one or more group identities of one or more groups of member or mobile identity elements.

The API may be further defined at least in part by the one or more API request types to further provide a selective assignment of member and/or mobile identities to a group identity of a group (step 1704C of FIG. 17). The API may be further defined at least in part by the one or more API request types to further provide a selective assignment of a group identity to a provisionable mobile service function of the subset (step 1704D of FIG. 17.).

A backend interface function may be provided at or with the API endpoint to cause the provisionable mobile service function of the mobile network to be executed for members and/or mobile identities of the selectively assigned group identity (step 1706 of FIG. 17).

Figure 18:
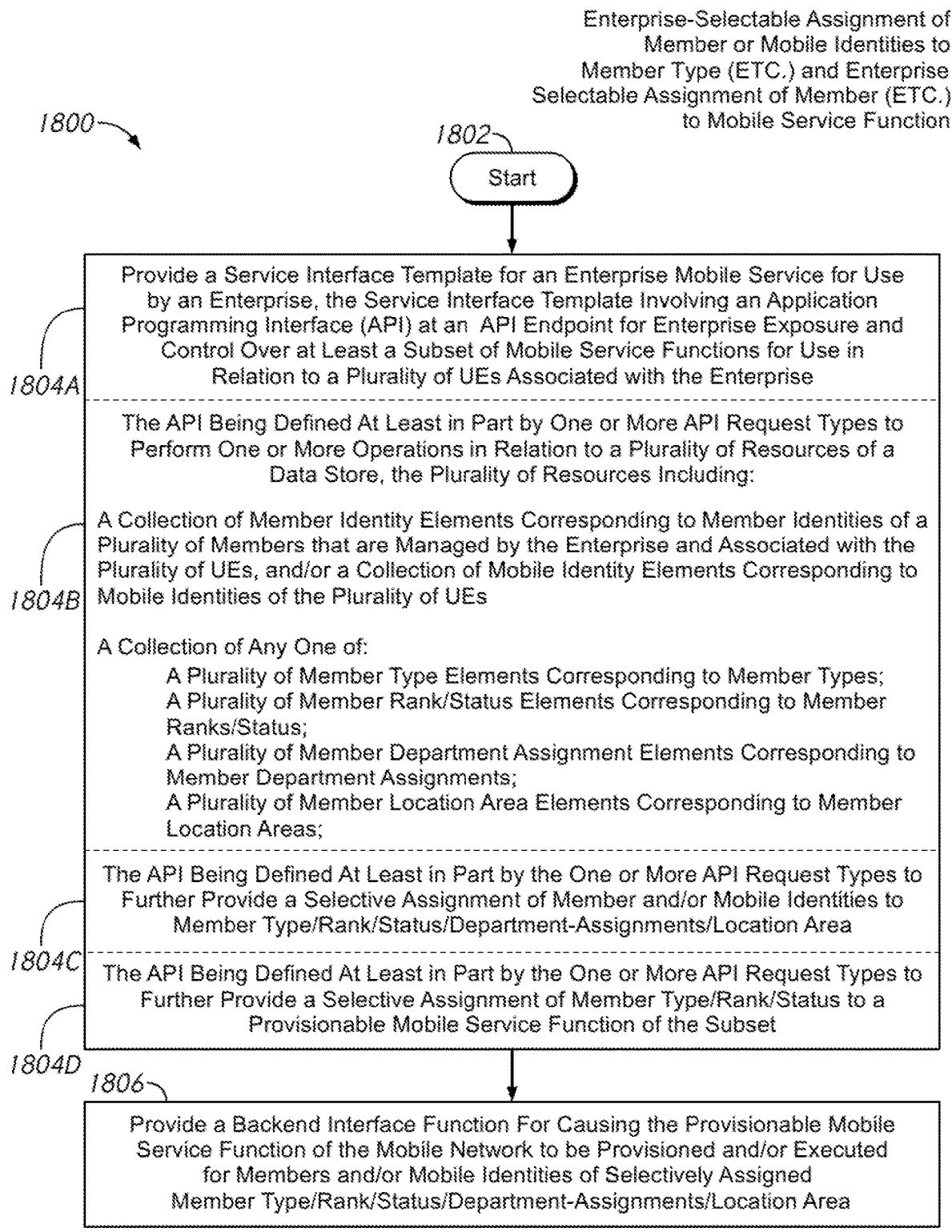
FIG. 18 is a flowchart for describing a method of providing an enterprise mobile service of a mobile network with selectively assignable member types, etc., for assignment to a mobile service function according to some implementations of the present disclosure.

FIG. 18 is a flowchart 1800 for describing a method of providing an enterprise mobile service of a mobile network with selectively assignable member types, etc., for assignment to a mobile service function according to some implementations of the present disclosure. Again, the method may be implemented in a mobile network which is configured to provide communications for UEs and include a plurality of mobile service functions.

Beginning at a start block 1802 of FIG. 18, a service interface template for an enterprise mobile service may be provided by a mobile network for use by an enterprise (step 1804A of FIG. 18). The service interface template may an API at an API endpoint for enterprise exposure and control over a subset of the mobile service functions for use in relation to a plurality of UEs associated with the enterprise (step 1804B of FIG. 18). The API may be defined at least in part by one or more API request types to perform one or more operations in relation to a plurality of resources of a data store.

The plurality of resources operated on may include a collection of member identity elements corresponding to member identities of a plurality of members that are managed by the enterprise and associated with the plurality of UEs, and/or a collection of mobile identity elements corresponding to mobile identities of the plurality of UEs.

The plurality of resources operated on may further include a collection of any one of a plurality of member type elements corresponding to member types; a plurality of member rank/status elements corresponding to member ranks/status; a plurality of member department assignment elements corresponding to member department assignments; and a plurality of member location area elements corresponding to member location areas.

The API may be further defined at least in part by the one or more API request types to further provide a selective assignment of member and/or mobile identities to member type/rank/status/department-assignments/location area (step 1804C of FIG. 18). The API may be further defined at least in part by the one or more API request types to further provide a selective assignment of member type/rank/status/department-assignments/location area to a provisionable mobile service function of the subset (step 1804D of FIG. 18).

A backend interface function may be provided at or with the API endpoint to cause the provisionable mobile service function of the mobile network to be provisioned and/or executed for members and/or mobile identities of the selectively assigned member type/rank/status/department-assignments/location area (step 1806 of FIG. 18).

FIG. 19 is an illustrative representation 1900 of example mobile service functions and enterprise member information associated with an enterprise (e.g. as viewed from a GUI of the enterprise) according to some implementations of the present disclosure. A plurality of mobile service functions 1902 for an enterprise mobile service for "Cisco Technology, Inc." include "Emergency_Notify," "Periodic_App_Reporting," "Periodic_Data_Upload," and "Service-Access-Triggered Reporting." A plurality of member identities 1920 (e.g. member name, member ID, etc.) include a member 1904 corresponding to "John Doe" which is associated a plurality of selected indicators 1906 (e.g. Mobile ID, Department, Location Area, Member Type, Member Rank/Status, and Group ID) as shown. The plurality of member identities 1920 also include a member 1908 corresponding to "Jane Smith" which is associated a plurality of selected indicators 1910 (e.g. also Mobile ID, Department, Location Area, Member Type, Member Rank/Status, and Group ID) as shown. As is apparent, members (e.g. employees) may be assigned to various indicators, and these indicators may be assigned or associated with one or more mobile service functions.

FIG. 20 is an illustrative representation 2000 of example mobile service functions and selectively-assigned indications associated with the functions (e.g. as viewed from a GUI of the enterprise) according to some implementations of the present disclosure. A plurality of mobile service functions 5002 for an enterprise mobile service is shown. The plurality of mobile service functions 5002 include a "Periodic_Data_Upload" function 2010, a "Periodic_Data_Reporting" function 2020, and a "Server-Access-Triggered Reporting" function 2030. As shown, selective assignments were made in relation to these functions 2010, 2020, and 2030. For "Periodic_Data_Upload" function 2010, a member name 2014 of John Doe, a location area of West Coast, and a member type 2018 of Engineer have been selectively assigned. For "Periodic_Data_Reporting" function 2020, a location area 2024 of Non-U.S., a time period 2026 of 1 hour, and a Group ID 2027 of Engineering have been selectively assigned. For "Server-Access-Triggered Reporting" function 2030, a department 2034 of "All" and a server name of "Secret Files Server" have been selectively assigned.

Figure 21:
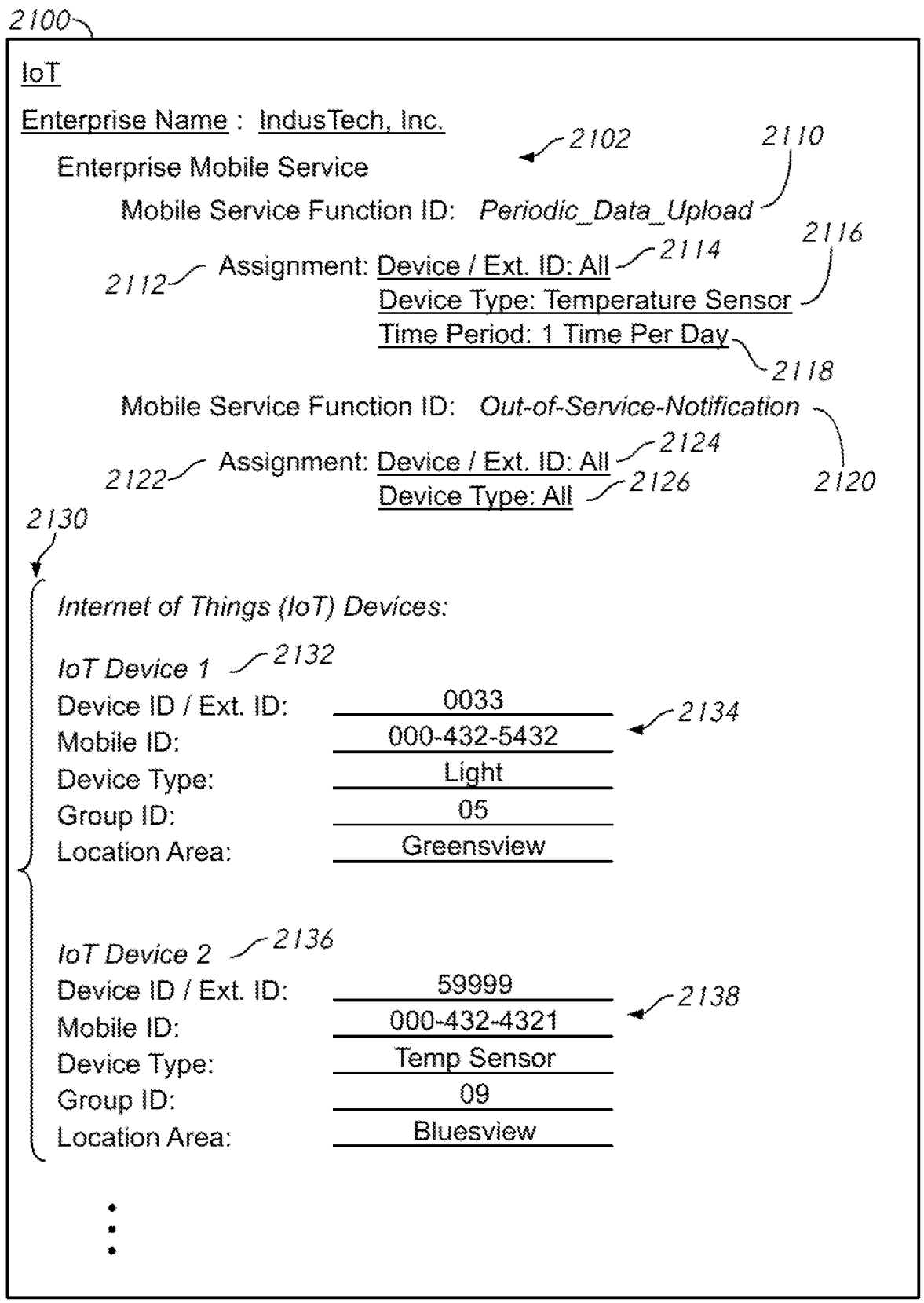
FIG. 21 is an illustrative representation of example mobile service functions for IoT (as well as selectively-assigned indications associated with the functions) and IoT device information associated with an enterprise (e.g. as viewed from a GUI of the enterprise) according to some implementations of the present disclosure.

FIG. 21 is an illustrative representation 2100 of example mobile service functions for IoT (as well as selectively-assigned indications associated with the functions) and IoT device information associated with an enterprise (e.g. as viewed from a GUI of the enterprise) according to some implementations of the present disclosure. A plurality of mobile service functions 2102 for an enterprise mobile service for "IndusTech Inc." and its managed IoT devices include "Periodic_Data_Upload" and "Out-of-Service-Notification." A plurality of IoT device informations 2130 for IoT devices relate to an IoT device 2132 associated a plurality of selected indicators 2134 (e.g. Device ID/External ID; Mobile ID; Device Type; Group ID; and Location area) as shown. The plurality of IoT device informations 2130 also relate to an IoT device 2136 associated a plurality of selected indicators 2138 (also e.g. Device ID/External ID; Mobile ID; Device Type; Group ID; and Location area) as shown. As is apparent, devices may be assigned to various indicators, and these indicators may be assigned or associated with one or more mobile service functions.

Figure 22:
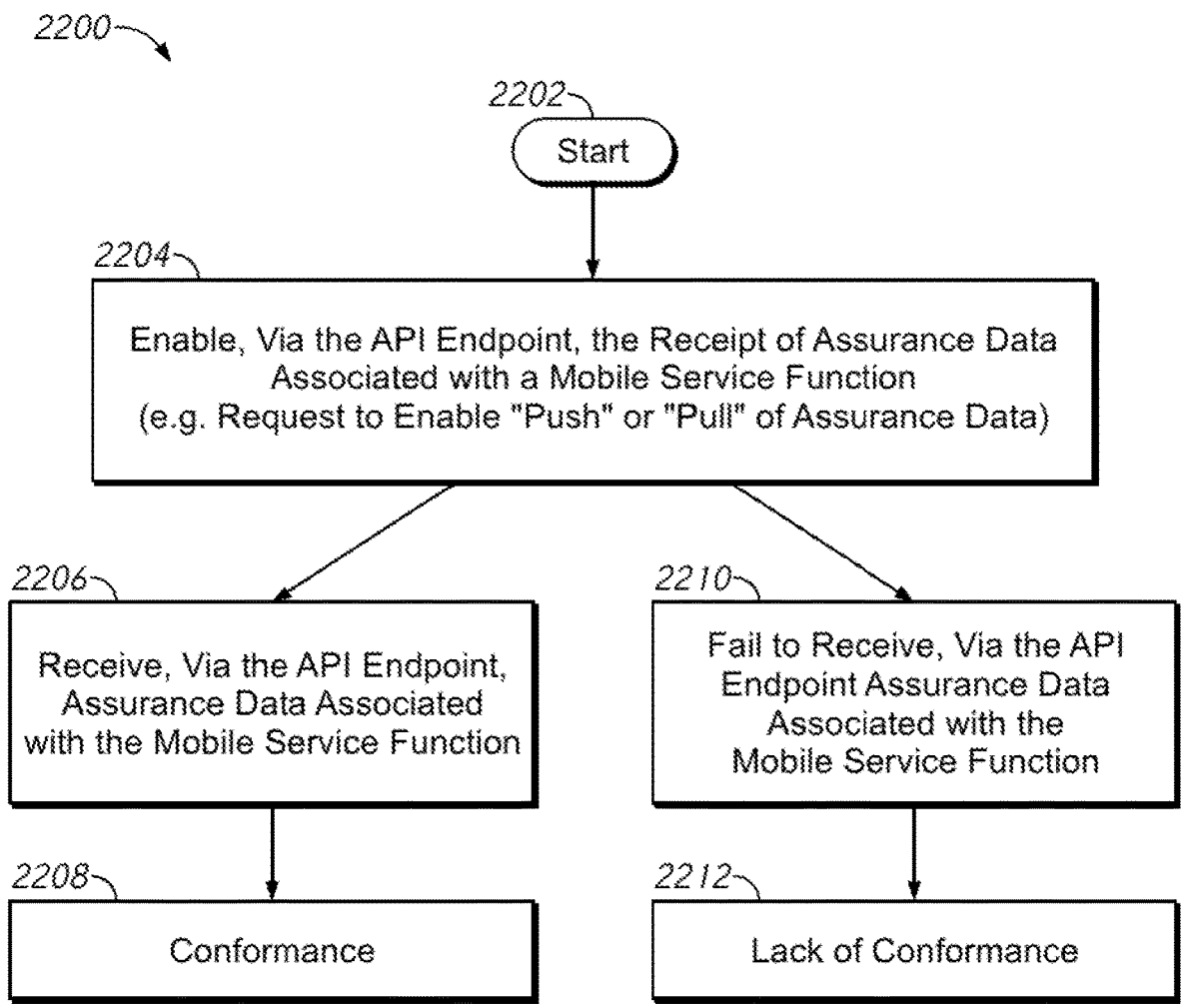
FIG. 22 is flowchart for describing a method of providing assurance data for an enterprise mobile service of a mobile network according to some implementations of the present disclosure.

FIG. 22 is flowchart 2200 for describing a method of providing assurance data for an enterprise mobile service according to some implementations of the present disclosure. The method may be performed at an API endpoint (e.g. API endpoint 520 of FIG. 9) used by the enterprise mobile service. Beginning at a start block 2204 of FIG. 22, assurance data receipt associated with a mobile service function is enabled via the API endpoint (step 2204 of FIG. 22). After such enablement, assurance data associated with the mobile service function may be received via the API endpoint (step 2206 of FIG. 22) and this may confirm conformance (step 2208 of FIG. 22). If unsuccessful after enablement, there is a failure of receipt of assurance data associated with the mobile service function and this may indicate a lack of conformance (step 2212 of FIG. 22). Alternatively in step 2212, data associated with the mobile service function may indeed be received, but the data specify or otherwise indicate a failure or error in performing the function. Also alternatively in step 2210, data associated with the mobile service function may indeed be received, but data patterns presented in the sequence of assurance data indicate a failure or error in performing the function.

FIG. 23 is an illustrative representation 2300 of example assurance data according to some implementations of the disclosure. As indicated in FIG. 23, an assurance data 2302 may be associated with a mobile service function which is a "Periodic_App_Reporting." A plurality of receipts of assurance data (represented in the example as log events) show the periodic reporting of applications, every hour, from the UE associated with John Doe while roaming in France. Also as indicated in FIG. 23, an assurance data 2304 may be associated with a mobile service function which is a "Periodic_Data_Upload" for IoT devices (e.g. a group of temperature sensors). A plurality of receipts of assurance data (again represented in the example as log events) show the stored confirmation of data uploads by the server, as well as an error in the data upload on 7 Nov. 2018.

The above-described approaches may be applied to both 4G/LTE and 5G mobile networks, and may be readily extended to technologies other than macro-cellular.

Note that, although in some implementations of the present disclosure, one or more (or all) of the components, functions, and/or techniques described in relation to the figures may be employed together for operation in a cooperative manner, each one of the components, functions, and/or techniques may indeed be employed separately and individually, to facilitate or provide one or more advantages of the present disclosure.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are used to distinguish one element from another. For example, a first identity could be termed a second identity, and similarly, a second identity could be termed a first identity, without changing the meaning of the description, so long as all occurrences of the "first identity" are renamed consistently and all occurrences of the "second identity" are renamed consistently. The first identity and the second identity are both identities, but they are not the same identity.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   in a mobile network configured to provide communications for user equipment (UE) and including a plurality of mobile service functions,
      exposing a service interface based on a service interface template which represents an enterprise mobile service for an enterprise, the service interface template indicating a plurality of capabilities of the enterprise mobile service, the plurality of capabilities including at least a subset of the plurality of mobile service functions in the mobile network;
      providing the enterprise mobile service for the enterprise via the service interface, which includes interfacing for communication with a host of a private enterprise network of the enterprise via an application programming interface (API) at an API endpoint, for enterprise exposure and control over the at least the subset of the plurality of mobile service functions for use in relation to a plurality of UEs operating in the mobile network and associated with a plurality of members of the enterprise, for exposure of the mobile network as a logical extension of the private enterprise network that the plurality of UEs have access to as members of the enterprise;
      wherein the API is defined at least in part by one or more API request types to perform one or more operations on a plurality of resources of a data store, the plurality of resources including a collection of selectable parameter indication elements corresponding to a plurality of selectable parameter indications; and
      wherein in response to receiving via the API endpoint a selected one of the plurality of selected parameter indications, causing one of the at least the subset of the plurality of mobile service functions of the mobile network to be provisioned with one or more provisionable parameters corresponding to the selected one of the plurality of selectable parameter indications.

2. The method of claim 1, wherein the plurality of selectable parameter indications comprise one of selectable geographic area indications, selectable bandwidth indications, selectable latency indications, or selectable communication quality indications.

3. The method of claim 1, wherein the API endpoint is part of an API gateway configured to authenticate the enterprise as a condition for accessing the API endpoint.

4. The method of claim 1, wherein the API is defined at least in part by the one or more API request types to perform the one or more operations on the plurality of resources of the data store, to provide enabling or control over receipt of assurance data via the API endpoint for providing confirmation of execution of one of more of the at least the subset of the plurality of mobile service functions.

5. The method of claim 1, further comprising:
mapping the collection of selectable parameter indication elements to a plurality of provisionable parameters of the mobile network.

6. The method of claim 1, further comprising:
wherein the API is defined at least in part by the one or more API request types to perform one or more operations for creating, reading, updating, and/or deleting at least some of the plurality of resources in the data store.

7. The method of claim 1, further comprising:
wherein the API is defined at least in part by the one or more API request types to perform the one or more operations on the plurality of resources of the data store which further include:
a collection of member identity elements corresponding to member identities of the plurality of members, and/or
a collection of mobile identity elements corresponding to mobile identities of the plurality of UEs.

8. The method of claim 7, further comprising:
wherein the API is defined at least in part by the one or more API request types to perform the one or more operations on the plurality of resources of the data store, to provide a selective assignment of member and/or mobile identities to a mobile service function; and
wherein in response to receiving via the API endpoint the selective assignment of the member and/or mobile identities to the mobile service function, causing the mobile service function of the mobile network to be executed for the selective assignment of member and/or mobile identities.

9. The method of claim 1, further comprising:
wherein the plurality of resources of the data store further include:
a collection of one or more group identity elements corresponding to one or more group identities of one or more groups of member or mobile identities;
wherein the API is defined at least in part by the one or more API request types to provide a selective assignment of a group identity to a mobile service function; and
wherein in response to receiving via the API endpoint the selective assignment of the group identity to the mobile service function, causing the mobile service function of the mobile network to be executed for the member or mobile identities of the selective assignment of the group identity.

10. The method of claim 1, further comprising:
wherein the plurality of resources of the data store further include:
a collection of selectable geographic area elements associated with a plurality of selectable geographic areas;
wherein the API is defined at least in part by the one or more API request types to provide a selective assignment of a geographic area to a mobile service function; and
wherein in response to receiving via the API endpoint the selective assignment of the geographic area to the mobile service function, causing the mobile service function of the mobile network to be provisioned with one or more geographic parameters corresponding to the selective assignment of the geographic area.

11. The method of claim 1, wherein the at least the subset of the plurality of mobile service functions include a UE-location-based triggered function for the plurality of UEs operating in the mobile network.

12. The method of claim 1, wherein the at least the subset of the plurality of mobile service functions include one or more of the following:
a function for a UE-location-based access or denial to a server or network;
a function for a UE-out-of-service sending of notification messages;
a function for a UE-location-based sending of notification messages;
a function for a UE-location-based-triggering of reporting of application identities associated with applications-in-use;
a function for a UE-location-based-triggered setting of a (redirect) server address of an application server to use by a UE;
a function for a UE-location-based-triggered sending of messaging of a redirect address for a UE-initiated communication to a node;
a function for a regular or periodic reporting of applications-in-use for a UE;
a function for an application-invocation-triggered reporting of an application identity associated with an invoked application;
a function for a reporting of identification of a roaming network for a UE; and
a function for a reporting of an identification of a location area after UE attachment to a network.

13. A method comprising:
in a mobile network configured to provide communications for user equipment (UE) and including a plurality of mobile service functions,
exposing a service interface based on a service interface template which represents an enterprise mobile service for an enterprise, the service interface template indicating a plurality of capabilities of the enterprise mobile service, the plurality of capabilities including at least a subset of the plurality of mobile service functions in the mobile network;
providing the enterprise mobile service for the enterprise via the service interface, which includes interfacing for communication with a host of a private enterprise network of the enterprise via an application programming interface (API) at an API endpoint, for enterprise exposure and control over the at least the subset of the plurality of mobile service functions for use in relation to a plurality of UEs operating in the mobile network and associated with a plurality of members of the enterprise, for exposure of the mobile network as a logical extension of the private enterprise network that the plurality of UEs have access to as members of the enterprise;
wherein the API is defined at least in part by one or more API request types to perform one or more operations on a plurality of resources of a data store, the plurality of resources including:
- a collection of member identity elements corresponding to member identities of the plurality of members, and/or a collection of mobile identity elements corresponding to mobile identities of the plurality of UEs;
- a collection of one or more group identity elements corresponding to one or more group identities of one or more groups of member or mobile identity elements;

wherein the one or more operations of the one or more API request types include an operation to provide a selective assignment of a group identity to one of the at least the subset of the plurality of mobile service functions; and wherein in response to receiving via the API endpoint the selective assignment of the group identity, causing the one of the at least the subset of the plurality of mobile service functions to be provisioned and/or executed for members and/or mobile identities of the selective assignment of the group identity.

14. A method comprising:
in a mobile network configured to provide communications for user equipment (UE) and including a plurality of mobile service functions,
- exposing a service interface which is based on a service interface template which represents an enterprise mobile service for an enterprise, the service interface template indicating a plurality of capabilities of the enterprise mobile service, the plurality of capabilities including at least a subset of the plurality of mobile service functions in the mobile network; and
- interfacing for communication with a host of a private enterprise network of the enterprise via the serving interface which comprises an application programming interface (API) at an API endpoint, for enterprise exposure and control over the at least the subset of the plurality of mobile service functions for use in relation to a plurality of UEs operating in the mobile network and associated with a plurality of members of the enterprise, for exposure of the mobile network as a logical access network extension of the private enterprise network that the plurality of UEs have access to as members of the enterprise;

wherein the API is defined at least in part by one or more API request types to perform one or more operations on a plurality of resources of a data store, the plurality of resources including a collection of selectable parameter indication elements corresponding to a plurality of selectable parameter indications; and wherein in response to receiving via the API endpoint a selected one of the plurality of selected parameter indications, causing one of the at least the subset of the plurality of mobile service functions of the mobile network to be provisioned with one or more provisionable parameters corresponding to the selected one of the plurality of selectable parameter indications.

15. The method of claim 14, wherein the plurality of selectable parameter indications comprise one of selectable geographic area indications, selectable bandwidth indications, selectable latency indications, or selectable communication quality indications.

16. The method of claim 14, further comprising:
wherein the API is defined at least in part by the one or more API request types to perform one or more operations for creating, reading, updating, and deleting at least some of the plurality of resources in the data store.

17. The method of claim 14, wherein the API is defined at least in part by the one or more API request types to perform the one or more operations on the plurality of resources of the data store, to provide enabling or control over receipt of assurance data via the API endpoint for providing confirmation of execution of one of more of the at least the subset of the plurality of mobile service functions.

18. The method of claim 14, wherein the at least the subset of the plurality of mobile service functions include a UE-location-based triggered function for the plurality of UEs.

* * * * *